United States Patent
Dela Rosa et al.

(10) Patent No.: US 12,541,966 B2
(45) Date of Patent: Feb. 3, 2026

(54) FEW-SHOT LOGO RECOGNITION SYSTEM

(71) Applicant: Snap Inc., Santa Monica, CA (US)

(72) Inventors: Kevin Sarabia Dela Rosa, Seattle, WA (US); Hao Hu, Bellevue, WA (US); Pengxiang Wu, Bellevue, WA (US)

(73) Assignee: Snap Inc., Santa Monica, CA (US)

( * ) Notice: Subject to any disclaimer, the term of this patent is extended or adjusted under 35 U.S.C. 154(b) by 357 days.

(21) Appl. No.: 18/233,704

(22) Filed: Aug. 14, 2023

(65) Prior Publication Data

US 2025/0061696 A1 Feb. 20, 2025

(51) Int. Cl.
*G06V 10/82* (2022.01)
*G06V 10/22* (2022.01)
*G06V 10/764* (2022.01)

(52) U.S. Cl.
CPC .......... *G06V 10/82* (2022.01); *G06V 10/225* (2022.01); *G06V 10/765* (2022.01); *G06V 2201/09* (2022.01)

(58) Field of Classification Search
CPC .. G06V 2201/09; G06V 10/761; G06V 10/40; G06V 10/764; G06V 10/462; G06V 30/10; G06F 16/438; G06F 16/953
See application file for complete search history.

(56) References Cited

U.S. PATENT DOCUMENTS 10,007,863 B1 * 6/2018 Pereira ............... G06T 7/337
2016/0048536 A1 * 2/2016 Di ..................... G06F 16/583
382/165

OTHER PUBLICATIONS

Meng, Ye, et al. "An adaptive representation algorithm for multi-scale logo detection." Displays 70 (2021): 102090. (Year: 2021).*
"International Application Serial No. PCT/US2024/042070, International Search Report mailed Nov. 4, 2024", 4 pgs.
"International Application Serial No. PCT/US2024/042070, Written Opinion mailed Nov. 4, 2024", 5 pgs.
Hou, Sujuan, et al., "Few-shot logo detection", IET Computer Vision, vol. 17, No. 5, Michael Faraday House, Six Hills Way, Stevenage, Herts. SG1 2AY, UK, (May 15, 2023), 586-598.
Qiang, Hou, et al., "FoodLogoDet-1500: A Dataset for Large-Scale Food Logo Detection via Multi-Scale Feature Decoupling Network", Arxiv.Org, Cornell University Library, 201 Olin Library Cornell University Ithaca, NY 14853, (Aug. 10, 2021), 10 pgs.
Wesley, G., et al., "Cos R-CNN for Online Few-shot Object Detection", arXiv preprint, arXiv:2307.13485v1, [Online]. Retrieved from the Internet: <URL:https://arxiv.org/pdf/>, (Jul. 25, 2023), 9 pgs.

* cited by examiner

*Primary Examiner* — Raphael Schwartz
(74) *Attorney, Agent, or Firm* — Schwegman Lundberg & Woessner, P.A.

(57) ABSTRACT

Methods and systems are disclosed for building a few-shot logo recognition system that includes accessing an image with several regions of interest and identifying several objects within the regions of interest using a logo detector neural network. For each object, the logo detector neural network indicates whether the object is a logo. The methods and systems also generate a first and second set of image feature data and a first and second ranked list of logos. A final ranked list of logos is generated based on the first and second ranked list of logos and a category associated with each logo in the final ranked list of logos is identified.

20 Claims, 11 Drawing Sheets

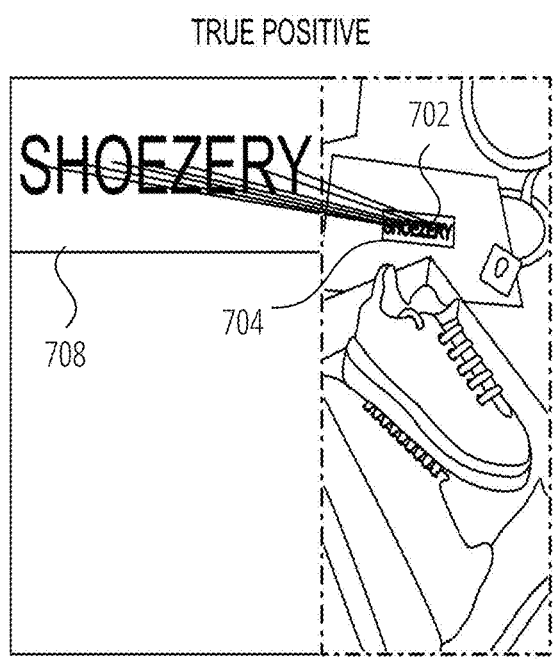
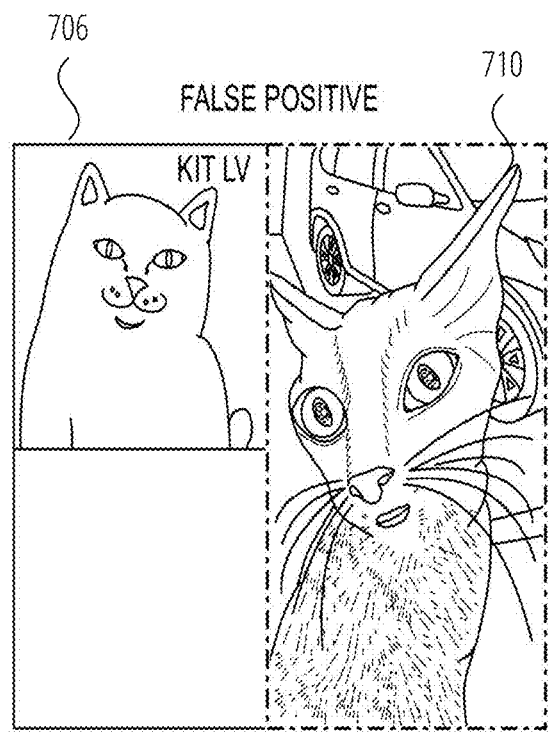
FIG. 7A  FIG. 7B

FEW-SHOT LOGO RECOGNITION SYSTEM

TECHNICAL FIELD

Embodiments herein relate generally to systems and methods for recognizing logos within an image. More specifically, the present disclosure addresses detecting and recognizing logos within images in a few-shot manner using a trained neural network.

BACKGROUND

Neural networks are a powerful tool in image processing tasks. Specifically, image recognition software uses neural networks to identify and distinguish objects depicted in an image.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIGS. 7A-7B illustrates examples of geometric verification employed by the logo recognition system, according to some examples.

DETAILED DESCRIPTION

Figure 1:
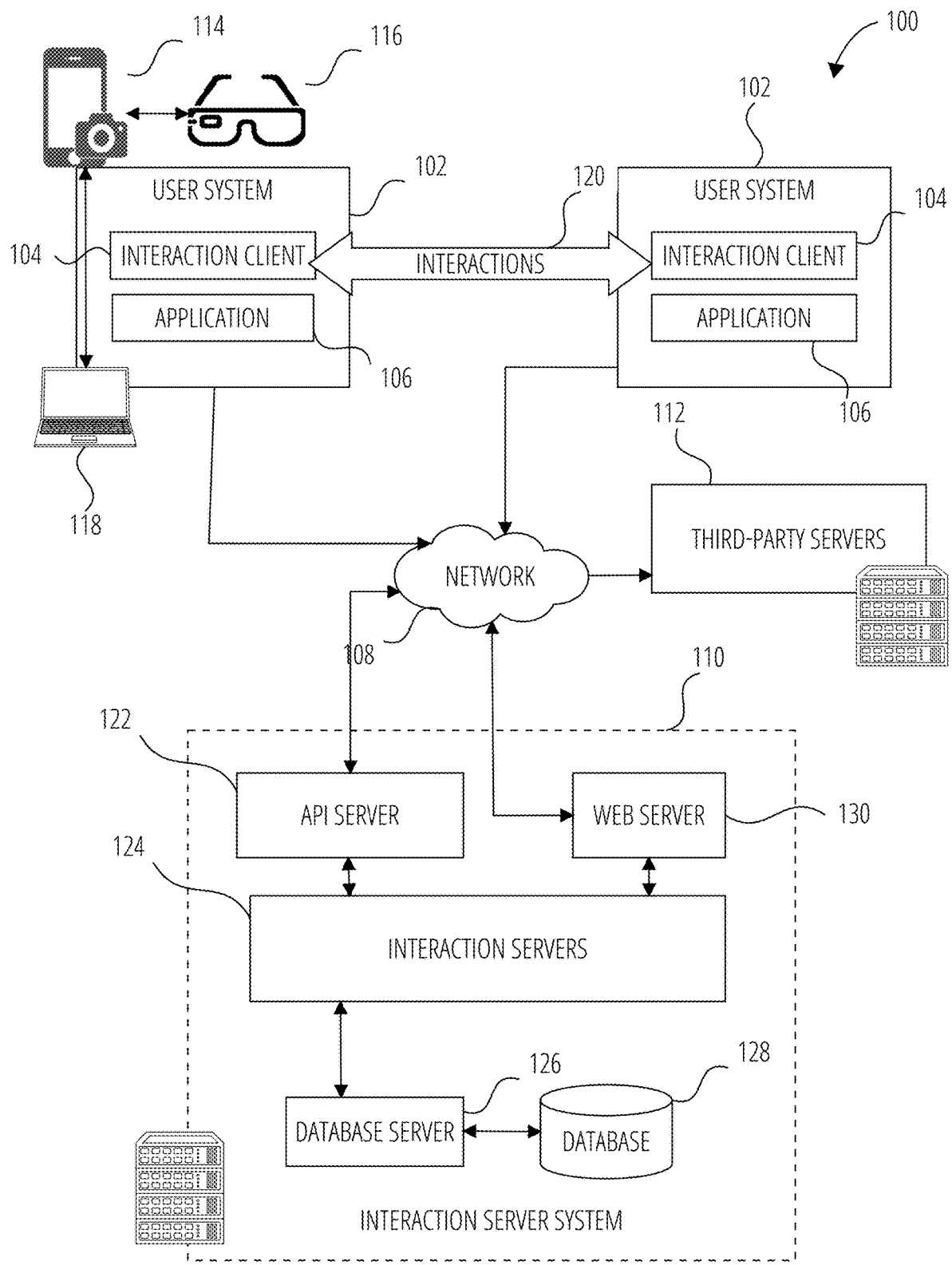
FIG. 1 is a diagrammatic representation of a networked environment in which the present disclosure may be deployed, according to some examples.

Identifying logos in an image is a challenging task as logos are feature-scarce and have few and non-distinguishable image features. The appearance of logos varies drastically in real-world images due to lighting effects, distance, quality, and other barriers that prevent the logo appearance from being clearly captured. Additionally, some logos may appear to be three-dimensional in the real world, but corresponding database images are two-dimensional, thus making it difficult to use the database images to identify and verify logos in the real world. Furthermore, logos pictured within images tend to be small in size and thus, difficult to detect.

Training a neural network for logo recognition generally requires the collection of thousands of labeled training images. Inconveniently, an additional retraining step may be required for new logos if new logos were not previously included in the training dataset. This additional step to incorporate new logos into the training dataset is a procedure which can be extremely time consuming. As such, previous methods perform poorly on logos which are uncommonly used within the real world as it becomes difficult to collect a large amount of training images for such logos.

Embodiments described herein describe a logo recognition system that detects and identifies logos within an image. The logo recognition system includes a neural network that, in some examples, only requires a training dataset of one or a small number of exemplar (e.g., labeled) logo images (e.g., less than ten images). The logo recognition system can detect and identify new logos instantaneously with no actual retraining step. Additionally, the logo recognition system has a stronger ability to recognize logos that are uncommonly used within the real world and suppress spurious false positive results than previous methods. In an example embodiment, the logo recognition system may support identification and detection of over 2,800 logos and corresponding logo categories (e.g., brands).

The input to the logo recognition system is an image with potential logos. The output of the logo recognition system includes the categories associated with each identified logo. A category may include a name or brand-name associated with the logo. The logo recognition system as described is composed of four components: a logo detector, an image feature extractor, a candidate retriever, and a geometric verification-based candidate filter.

The description that follows includes systems, methods, techniques, and instruction sequences that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Networked Computing Environment

FIG. 1 is a block diagram showing an example interaction system 100 for facilitating interactions (e.g., exchanging text messages, conducting text audio and video calls, or playing games) over a network. The interaction system 100 includes multiple user systems 102, each of which hosts multiple applications, including an interaction client 104 and other applications 106. Each interaction client 104 is communicatively coupled, via one or more communication networks including a network 108 (e.g., the Internet), to other instances of the interaction client 104 (e.g., hosted on respective other user systems 102), an interaction server system 110 and third-party servers 112). An interaction client 104 may also communicate with locally hosted applications 106 using Applications Program Interfaces (APIs).

Each user system 102 may include multiple user devices, such as a mobile device 114, head-wearable apparatus 116, and a computer client device 118 that are communicatively connected to exchange data and messages.

An interaction client 104 interacts with other interaction clients 104 and with the interaction server system 110 via the network 108. The data exchanged between the interaction clients 104 (e.g., interactions 120) and between the interaction clients 104 and the interaction server system 110 includes functions (e.g., commands to invoke functions) and payload data (e.g., text, audio, video, or other multimedia data).

The interaction server system 110 provides server-side functionality via the network 108 to the interaction clients 104. While certain functions of the interaction system 100 are described herein as being performed by either an interaction client 104 or by the interaction server system 110, the location of certain functionality either within the interaction client 104 or the interaction server system 110 may be a design choice. For example, it may be technically preferable to initially deploy particular technology and functionality within the interaction server system 110 but to later migrate this technology and functionality to the interaction client 104 where a user system 102 has sufficient processing capacity.

The interaction server system 110 supports various services and operations that are provided to the interaction clients 104. Such operations include transmitting data to, receiving data from, and processing data generated by the interaction clients 104. This data may include message content, client device information, geolocation information, media augmentation and overlays, message content persistence conditions, entity relationship information, and live event information. Data exchanges within the interaction system 100 are invoked and controlled through functions available via user interfaces (UIs) of the interaction clients 104.

Turning now specifically to the interaction server system 110, an Application Program Interface (API) server 122 is coupled to and provides programmatic interfaces to interaction servers 124, making the functions of the interaction servers 124 accessible to interaction clients 104, other applications 106 and third-party server 112. The interaction servers 124 are communicatively coupled to a database server 126, facilitating access to a database 128 that stores data associated with interactions processed by the interaction servers 124. Similarly, a web server 130 is coupled to the interaction servers 124 and provides web-based interfaces to the interaction servers 124. To this end, the web server 130 processes incoming network requests over the Hypertext Transfer Protocol (HTTP) and several other related protocols.

The Application Program Interface (API) server 122 receives and transmits interaction data (e.g., commands and message payloads) between the interaction servers 124 and the user systems 102 (and, for example, interaction clients 104 and other application 106) and the third-party server 112. Specifically, the Application Program Interface (API) server 122 provides a set of interfaces (e.g., routines and protocols) that may be called or queried by the interaction client 104 and other applications 106 to invoke functionality of the interaction servers 124. The Application Program Interface (API) server 122 exposes various functions supported by the interaction servers 124, including account registration; login functionality; the sending of interaction data, via the interaction servers 124, from a particular interaction client 104 to another interaction client 104; the communication of media files (e.g., images or video) from an interaction client 104 to the interaction servers 124; the settings of a collection of media data (e.g., a story); the retrieval of a list of friends of a user of a user system 102; the retrieval of messages and content; the addition and deletion of entities (e.g., friends) to an entity relationship graph (e.g., the entity graph 310); the location of friends within an entity relationship graph; and opening an application event (e.g., relating to the interaction client 104).

The interaction servers 124 host multiple systems and subsystems, described below with reference to FIG. 2.

System Architecture

Figure 2:
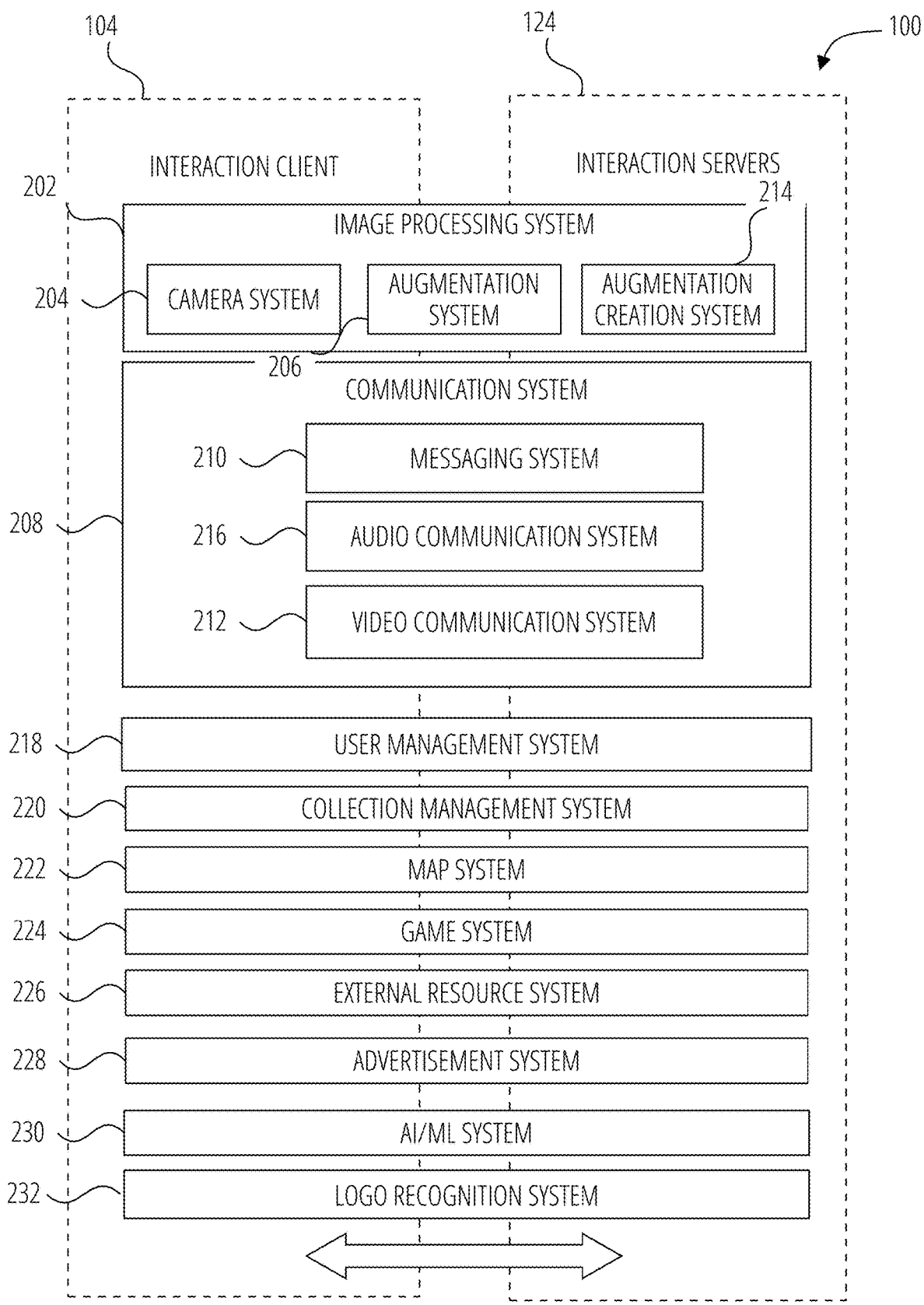
FIG. 2 is a diagrammatic representation of a messaging system that has both client-side and server-side functionality, according to some examples.

FIG. 2 is a block diagram illustrating further details regarding the interaction system 100, according to some examples. Specifically, the interaction system 100 is shown to comprise the interaction client 104 and the interaction servers 124. The interaction system 100 embodies multiple subsystems, which are supported on the client-side by the interaction client 104 and on the server-side by the interaction servers 124. In some examples, these subsystems are implemented as microservices. A microservice subsystem (e.g., a microservice application) may have components that enable it to operate independently and communicate with other services. Example components of microservice subsystem may include:

Function logic: The function logic implements the functionality of the microservice subsystem, representing a specific capability or function that the microservice provides.

API interface: Microservices may communicate with each other components through well-defined APIs or interfaces, using lightweight protocols such as REST or messaging. The API interface defines the inputs and outputs of the microservice subsystem and how it interacts with other microservice subsystems of the interaction system 100.

Data storage: A microservice subsystem may be responsible for its own data storage, which may be in the form of a database, cache, or other storage mechanism (e.g., using the database server 126 and database 128). This enables a microservice subsystem to operate independently of other microservices of the interaction system 100.

Service discovery: Microservice subsystems may find and communicate with other microservice subsystems of the interaction system 100. Service discovery mechanisms enable microservice subsystems to locate and communicate with other microservice subsystems in a scalable and efficient way.

Monitoring and logging: Microservice subsystems may need to be monitored and logged in order to ensure availability and performance. Monitoring and logging mechanisms enable the tracking of health and performance of a microservice subsystem.

In some examples, the interaction system 100 may employ a monolithic architecture, a service-oriented architecture (SOA), a function-as-a-service (FaaS) architecture, or a modular architecture:

Example subsystems are discussed below.

An image processing system 202 provides various functions that enable a user to capture and augment (e.g., annotate or otherwise modify or edit) media content associated with a message.

A camera system 204 includes control software (e.g., in a camera application) that interacts with and controls hardware camera hardware (e.g., directly or via operating system controls) of the user system 102 to modify and augment real-time images captured and displayed via the interaction client 104.

The augmentation system 206 provides functions related to the generation and publishing of augmentations (e.g., media overlays) for images captured in real-time by cameras of the user system 102 or retrieved from memory of the user system 102. For example, the augmentation system 206 operatively selects, presents, and displays media overlays (e.g., an image filter or an image lens) to the interaction client 104 for the augmentation of real-time images received via the camera system 204 or stored images retrieved from memory 902 of a user system 102. These augmentations are selected by the augmentation system 206 and presented to a user of an interaction client 104, based on a number of inputs and data, such as for example:

Geolocation of the user system 102; and
  Entity relationship information of the user of the user system 102.

An augmentation may include audio and visual content and visual effects. Examples of audio and visual content include pictures, texts, logos, animations, and sound effects. An example of a visual effect includes color overlaying. The audio and visual content or the visual effects may be applied to a media content item (e.g., a photo or video) at user system 102 for communication in a message, or applied to video content, such as a video content stream or feed transmitted from an interaction client 104. As such, the image processing system 202 may interact with, and support, the various subsystems of the communication system 208, such as the messaging system 210 and the video communication system 212.

A media overlay may include text or image data that may be overlaid on top of a photograph taken by the user system 102 or a video stream produced by the user system 102. In some examples, the media overlay may be a location overlay (e.g., Venice beach), a name of a live event, or a name of a merchant overlay (e.g., Beach Coffee House). In further examples, the image processing system 202 uses the geolocation of the user system 102 to identify a media overlay that includes the name of a merchant at the geolocation of the user system 102. The media overlay may include other indicia associated with the merchant. The media overlays may be stored in the databases 128 and accessed through the database server 126.

The image processing system 202 provides a user-based publication platform that enables users to select a geolocation on a map and upload content associated with the selected geolocation. The user may also specify circumstances under which a particular media overlay should be offered to other users. The image processing system 202 generates a media overlay that includes the uploaded content and associates the uploaded content with the selected geolocation.

The augmentation creation system 214 supports augmented reality developer platforms and includes an application for content creators (e.g., artists and developers) to create and publish augmentations (e.g., augmented reality experiences) of the interaction client 104. The augmentation creation system 214 provides a library of built-in features and tools to content creators including, for example custom shaders, tracking technology, and templates.

In some examples, the augmentation creation system 214 provides a merchant-based publication platform that enables merchants to select a particular augmentation associated with a geolocation via a bidding process. For example, the augmentation creation system 214 associates a media overlay of the highest bidding merchant with a corresponding geolocation for a predefined amount of time.

A communication system 208 is responsible for enabling and processing multiple forms of communication and interaction within the interaction system 100 and includes a messaging system 210, an audio communication system 216, and a video communication system 212. The messaging system 210 is responsible for enforcing the temporary or time-limited access to content by the interaction clients 104. The messaging system 210 incorporates multiple timers (e.g., within an ephemeral timer system) that, based on duration and display parameters associated with a message or collection of messages (e.g., a story), selectively enable access (e.g., for presentation and display) to messages and associated content via the interaction client 104. The audio communication system 216 enables and supports audio communications (e.g., real-time audio chat) between multiple interaction clients 104. Similarly, the video communication system 212 enables and supports video communications (e.g., real-time video chat) between multiple interaction clients 104.

A user management system 218 is operationally responsible for the management of user data and profiles, and maintains entity information (e.g., stored in entity tables 308, entity graphs 310 and profile data 302) regarding users and relationships between users of the interaction system 100.

A collection management system 220 is operationally responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 220 may also be responsible for publishing an icon that provides notification of a particular collection to the user interface of the interaction client 104.

The collection management system 220 includes a curation function that allows a collection manager to manage and curate a particular collection of content. For example, the curation interface enables an event organizer to curate a collection of content relating to a specific event (e.g., delete inappropriate content or redundant messages). Additionally, the collection management system 220 employs machine vision (or image recognition technology) and content rules to curate a content collection automatically. In certain examples, compensation may be paid to a user to include user-generated content into a collection. In such cases, the collection management system 220 operates to automatically make payments to such users to use their content.

A map system 222 provides various geographic location (e.g., geolocation) functions and supports the presentation of map-based media content and messages by the interaction client 104. For example, the map system 222 enables the display of user icons or avatars (e.g., stored in profile data 302) on a map to indicate a current or past location of "friends" of a user, as well as media content (e.g., collections of messages including photographs and videos) generated by such friends, within the context of a map. For example, a message posted by a user to the interaction system 100 from a specific geographic location may be displayed within the context of a map at that particular location to "friends" of a specific user on a map interface of the interaction client 104. A user may furthermore share his or her location and status information (e.g., using an appropriate status avatar) with other users of the interaction system 100 via the interaction client 104, with this location and status information being similarly displayed within the context of a map interface of the interaction client 104 to selected users.

A game system 224 provides various gaming functions within the context of the interaction client 104. The interaction client 104 provides a game interface providing a list of available games that may be launched by a user within the context of the interaction client 104 and played with other users of the interaction system 100. The interaction system 100 further enables a particular user to invite other users to participate in the play of a specific game by issuing invitations to such other users from the interaction client 104. The interaction client 104 also supports audio, video, and text messaging (e.g., chats) within the context of gameplay, provides a leaderboard for the games, and also supports the provision of in-game rewards (e.g., coins and items).

An external resource system 226 provides an interface for the interaction client 104 to communicate with remote servers (e.g., third-party servers 112) to launch or access external resources, i.e., applications or applets. Each third-party server 112 hosts, for example, a markup language (e.g., HTML5) based application or a small-scale version of an application (e.g., game, utility, payment, or ride-sharing application). The interaction client 104 may launch a web-based resource (e.g., application) by accessing the HTML5 file from the third-party servers 112 associated with the web-based resource. Applications hosted by third-party servers 112 are programmed in JavaScript leveraging a Software Development Kit (SDK) provided by the interaction servers 124. The SDK includes Application Programming Interfaces (APIs) with functions that may be called or invoked by the web-based application. The interaction servers 124 host a JavaScript library that provides a given external resource access to specific user data of the interaction client 104. HTML5 is an example of technology for programming games, but applications and resources programmed based on other technologies may be used.

To integrate the functions of the SDK into the web-based resource, the SDK is downloaded by the third-party server 112 from the interaction servers 124 or is otherwise received by the third-party server 112. Once downloaded or received, the SDK is included as part of the application code of a web-based external resource. The code of the web-based resource may then call or invoke certain functions of the SDK to integrate features of the interaction client 104 into the web-based resource.

The SDK stored on the interaction server system 110 effectively provides the bridge between an external resource (e.g., applications 106 or applets) and the interaction client 104. This gives the user a seamless experience of communicating with other users on the interaction client 104 while also preserving the look and feel of the interaction client 104. To bridge communications between an external resource and an interaction client 104, the SDK facilitates communication between third-party servers 112 and the interaction client 104. A bridge script running on a user system 102 establishes two one-way communication channels between an external resource and the interaction client 104. Messages are sent between the external resource and the interaction client 104 via these communication channels asynchronously. Each SDK function invocation is sent as a message and callback. Each SDK function is implemented by constructing a unique callback identifier and sending a message with that callback identifier.

By using the SDK, not all information from the interaction client 104 is shared with third-party servers 112. The SDK limits which information is shared based on the needs of the external resource. Each third-party server 112 provides an HTML5 file corresponding to the web-based external resource to interaction servers 124. The interaction servers 124 may add a visual representation (such as a box art or other graphic) of the web-based external resource in the interaction client 104. Once the user selects the visual representation or instructs the interaction client 104 through a GUI of the interaction client 104 to access features of the web-based external resource, the interaction client 104 obtains the HTML5 file and instantiates the resources to access the features of the web-based external resource.

The interaction client 104 presents a graphical user interface (e.g., a landing page or title screen) for an external resource. During, before, or after presenting the landing page or title screen, the interaction client 104 determines whether the launched external resource has been previously authorized to access user data of the interaction client 104. In response to determining that the launched external resource has been previously authorized to access user data of the interaction client 104, the interaction client 104 presents another graphical user interface of the external resource that includes functions and features of the external resource. In response to determining that the launched external resource has not been previously authorized to access user data of the interaction client 104, after a threshold period of time (e.g., 3 seconds) of displaying the landing page or title screen of the external resource, the interaction client 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the interaction client 104 adds the external resource to a list of authorized external resources and allows the external resource to access user data from the interaction client 104. The external resource is authorized by the interaction client 104 to access the user data under an OAuth 2 framework.

The interaction client 104 controls the type of user data that is shared with external resources based on the type of external resource being authorized. For example, external resources that include full-scale applications (e.g., an application 106) are provided with access to a first type of user data (e.g., two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

An advertisement system 228 operationally enables the purchasing of advertisements by third parties for presentation to end-users via the interaction clients 104 and also handles the delivery and presentation of these advertisements.

An artificial intelligence and machine learning system 230 provides a variety of services to different subsystems within the interaction system 100. For example, the artificial intelligence and machine learning system 230 operates with the image processing system 202 and the camera system 204 to analyze images and extract information such as objects, text, or faces. This information may then be used by the image processing system 202 to enhance, filter, or manipulate images. The artificial intelligence and machine learning system 230 may be used by the augmentation system 206 to generate augmented content and augmented reality experiences, such as adding virtual objects or animations to real-world images. The communication system 208 and messaging system 210 may use the artificial intelligence and machine learning system 230 to analyze communication patterns and provide insights into how users interact with each other and provide intelligent message classification and tagging, such as categorizing messages based on sentiment or topic. The artificial intelligence and machine learning system 230 may also provide chatbot functionality to message interactions 120 between user systems 102 and between a user system 102 and the interaction server system 110. The artificial intelligence and machine learning system 230 may also work with the audio communication system 216 to provide speech recognition and natural language processing capabilities, allowing users to interact with the interaction system 100 using voice commands.

A logo recognition system 232 is operationally responsible for detecting and identifying logos within an image. The logo recognition system 232 accesses an image with several regions of interest and identifies objects within the regions of interest. For each object, the logo recognition system 232 determines whether the identified object is a logo. Further details regarding the logo recognition system 232 can be found in the paragraphs below.

Data Architecture

Figure 3:
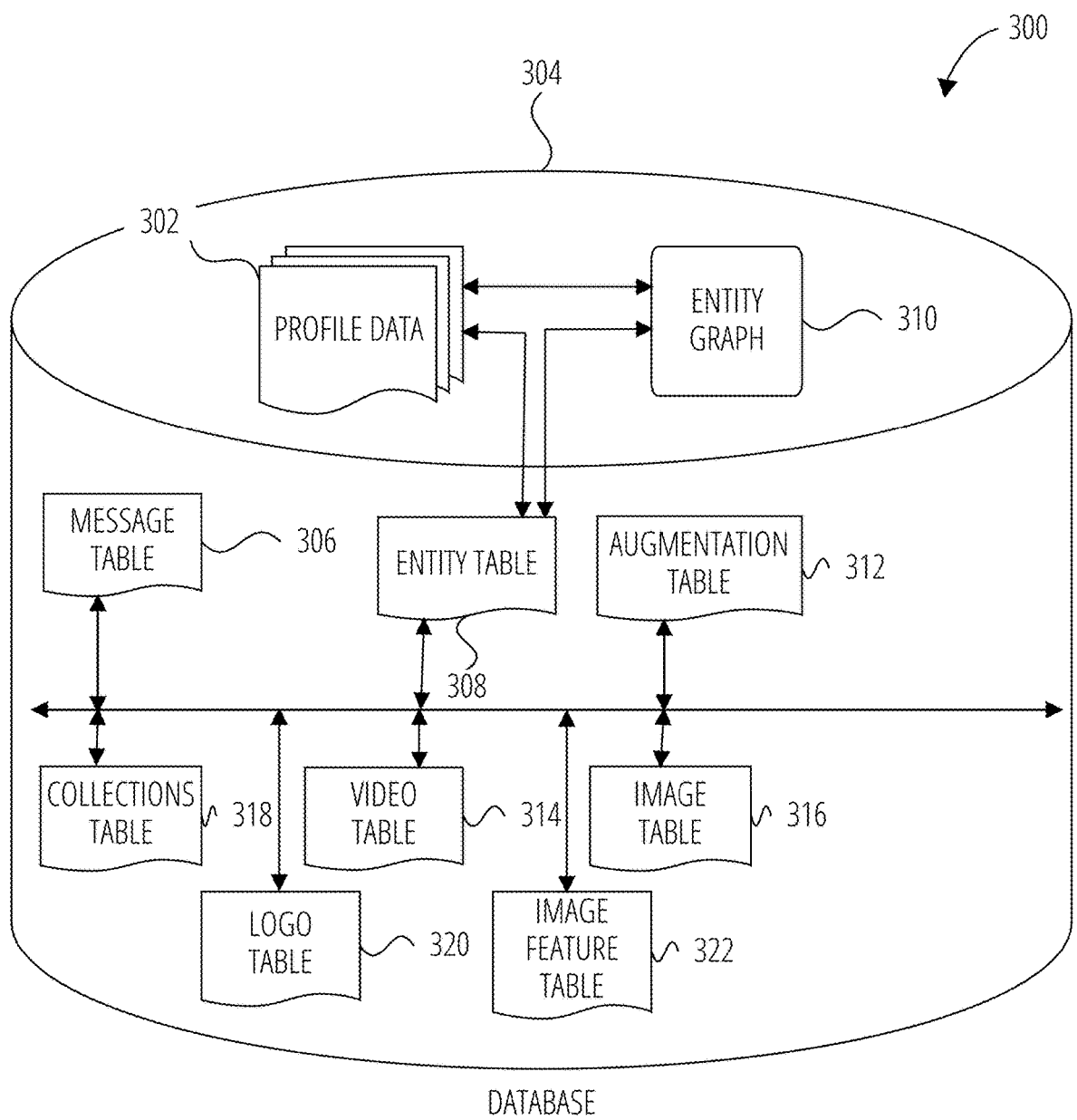
FIG. 3 is a diagrammatic representation of a data structure as maintained in a database, according to some examples.

FIG. 3 is a schematic diagram illustrating data structures 300, which may be stored in the database 304 of the interaction server system 110, according to certain examples. While the content of the database 304 is shown to comprise multiple tables, it will be appreciated that the data could be stored in other types of data structures (e.g., as an object-oriented database).

The database 304 includes message data stored within a message table 306. This message data includes, for any particular message, at least message sender data, message recipient (or receiver) data, and a payload. Further details regarding information that may be included in a message and included within the message data stored in the message table 306, are described below with reference to FIG. 3.

An entity table 308 stores entity data, and is linked (e.g., referentially) to an entity graph 310 and profile data 302. Entities for which records are maintained within the entity table 308 may include individuals, corporate entities, organizations, objects, places, events, and so forth. Regardless of entity type, any entity regarding which the interaction server system 110 stores data may be a recognized entity. Each entity is provided with a unique identifier, as well as an entity type identifier (not shown).

The entity graph 310 stores information regarding relationships and associations between entities. Such relationships may be social, professional (e.g., work at a common corporation or organization), interest-based, or activity-based, merely for example. Certain relationships between entities may be unidirectional, such as a subscription by an individual user to digital content of a commercial or publishing user (e.g., a newspaper or other digital media outlet, or a brand). Other relationships may be bidirectional, such as a "friend" relationship between individual users of the interaction system 100.

Certain permissions and relationships may be attached to each relationship, and also to each direction of a relationship. For example, a bidirectional relationship (e.g., a friend relationship between individual users) may include authorization for the publication of digital content items between the individual users but may impose certain restrictions or filters on the publication of such digital content items (e.g., based on content characteristics, location data or time of day data). Similarly, a subscription relationship between an individual user and a commercial user may impose different degrees of restrictions on the publication of digital content from the commercial user to the individual user and may significantly restrict or block the publication of digital content from the individual user to the commercial user. A particular user, as an example of an entity, may record certain restrictions (e.g., by way of privacy settings) in a record for that entity within the entity table 308. Such privacy settings may be applied to all types of relationships within the context of the interaction system 100 or may selectively be applied to certain types of relationships.

The profile data 302 stores multiple types of profile data about a particular entity. The profile data 302 may be selectively used and presented to other users of the interaction system 100 based on privacy settings specified by a particular entity. Where the entity is an individual, the profile data 302 includes, for example, a username, telephone number, address, settings (e.g., notification and privacy settings), as well as a user-selected avatar representation (or collection of such avatar representations). A particular user may then selectively include one or more of these avatar representations within the content of messages communicated via the interaction system 100, and on map interfaces displayed by interaction clients 104 to other users. The collection of avatar representations may include "status avatars," which present a graphical representation of a status or activity that the user may select to communicate at a particular time.

Where the entity is a group, the profile data 302 for the group may similarly include one or more avatar representations associated with the group, in addition to the group name, members, and various settings (e.g., notifications) for the relevant group.

The database 304 also stores augmentation data, such as overlays or filters, in an augmentation table 312. The augmentation data is associated with and applied to videos (for which data is stored in a video table 314) and images (for which data is stored in an image table 316).

Filters, in some examples, are overlays that are displayed as overlaid on an image or video during presentation to a recipient user. Filters may be of various types, including user-selected filters from a set of filters presented to a sending user by the interaction client 104 when the sending user is composing a message. Other types of filters include geolocation filters (also known as geo-filters), which may be presented to a sending user based on geographic location. For example, geolocation filters specific to a neighborhood or special location may be presented within a user interface by the interaction client 104, based on geolocation information determined by a Global Positioning System (GPS) unit of the user system 102.

Another type of filter is a data filter, which may be selectively presented to a sending user by the interaction client 104 based on other inputs or information gathered by the user system 102 during the message creation process. Examples of data filters include current temperature at a specific location, a current speed at which a sending user is traveling, battery life for a user system 102, or the current time.

Other augmentation data that may be stored within the image table 316 includes augmented reality content items (e.g., corresponding to applying "lenses" or augmented reality experiences). An augmented reality content item may be a real-time special effect and sound that may be added to an image or a video.

A collections table 318 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the interaction client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the interaction client 104, to contribute content to a particular live story. The live story may be identified to the user by the interaction client 104, based on his or her location. The end result is a "live story" told from a community perspective.

A further type of content collection is known as a "location story," which enables a user whose user system 102 is located within a specific geographic location (e.g., on a college or university campus) to contribute to a particular collection. In some examples, a contribution to a location story may employ a second degree of authentication to verify that the end-user belongs to a specific organization or other entity (e.g., is a student on the university campus).

As mentioned above, the video table 314 stores video data that, in some examples, is associated with messages for which records are maintained within the message table 306. Similarly, the image table 316 stores image data associated with messages for which message data is stored in the entity table 308. The entity table 308 may associate various augmentations from the augmentation table 312 with various images and videos stored in the image table 316 and the video table 314.

The database 304 also stores logo data in a logo table 320. The logo data stored in the logo table 320 may be used for training a neural network associated with the logo recognition system 232. The logo table 320 may be a labeled logo image dataset. The logo image dataset in the logo table 320 may be manually collected from the Internet by a user of the logo recognition system 232. In some examples, the logo table 320 may comprise a single manually collected logo image for a specific logo. In other examples, the logo table 320 may comprise less than ten manually collected logo images for a specific logo. The logo images may comprise at least one or more of a symbol, word, or name. The manually collected logo images can be used as query images to search one or more image databases (e.g., on the Internet) for similar images based on an image similarity measure. The manually collected logo images and the search results of the one or more Internet database images are stored in the logo table 320. The image similarity is measured based on a cosine similarity of image features.

The database 304 also stores feature data in an image feature table 322. The image feature table 322 may store multi-scale image feature data for all logo data stored in the logo table 320, a query image, and the regions of interest (ROIs) in the query image.

Data Communications Architecture

Figure 4:
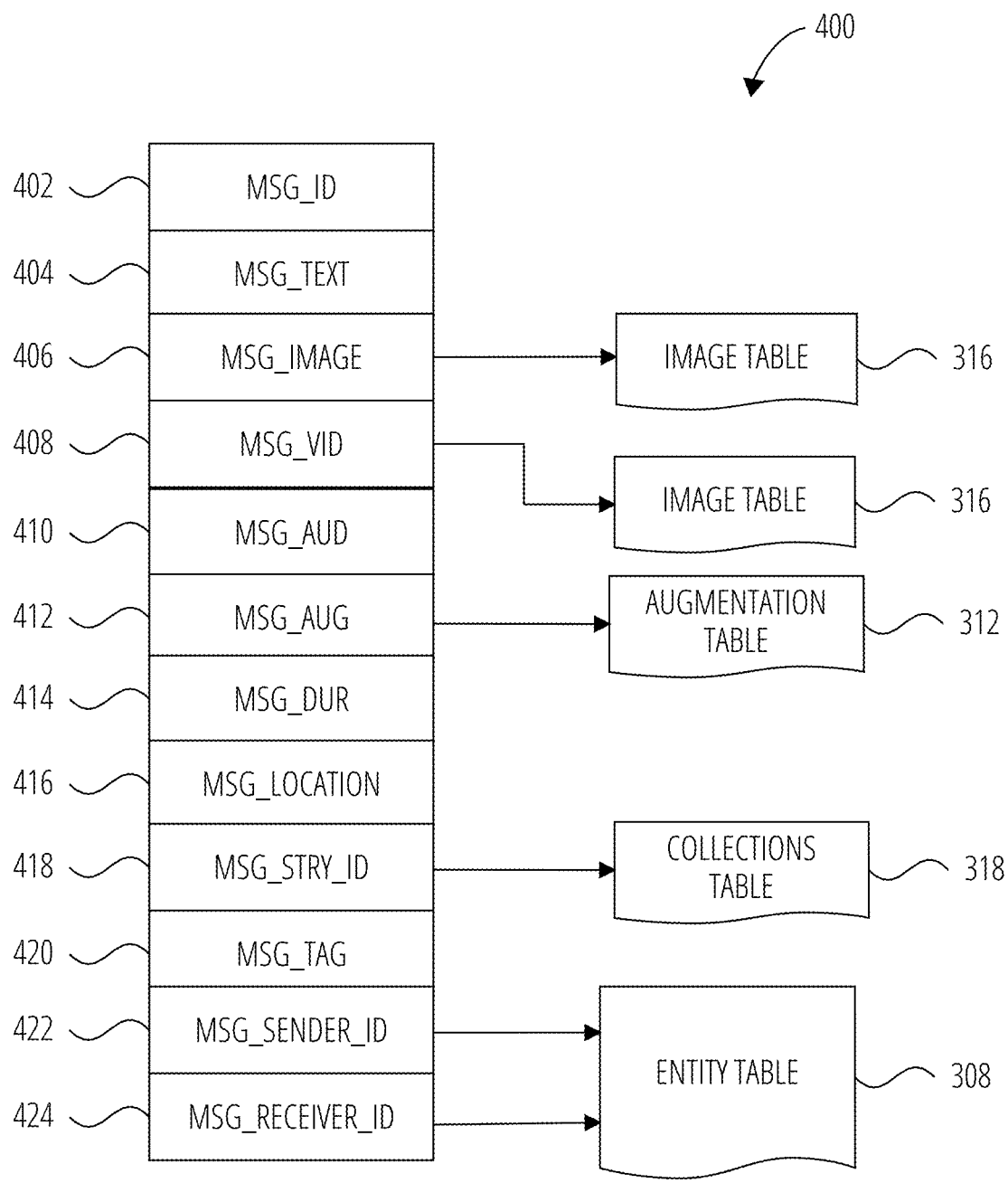
FIG. 4 is a diagrammatic representation of a message, according to some examples.

FIG. 4 is a schematic diagram illustrating a structure of a message 400, according to some examples, generated by an interaction client 104 for communication to a further interaction client 104 via the interaction servers 124. The content of a particular message 400 is used to populate the message table 306 stored within the database 304, accessible by the interaction servers 124. Similarly, the content of a message 400 is stored in memory as "in-transit" or "in-flight" data of the user system 102 or the interaction servers 124. A message 400 is shown to include the following example components:

Message identifier 402: a unique identifier that identifies the message 400.

Message text payload 404: text, to be generated by a user via a user interface of the user system 102, and that is included in the message 400.

Message image payload 406: image data, captured by a camera component of a user system 102 or retrieved from a memory component of a user system 102, and that is included in the message 400. Image data for a sent or received message 400 may be stored in the image table 316.

Message video payload 408: video data, captured by a camera component or retrieved from a memory component of the user system 102, and that is included in the message 400. Video data for a sent or received message 400 may be stored in the image table 316.

Message audio payload 410: audio data, captured by a microphone or retrieved from a memory component of the user system 102, and that is included in the message 400.

Message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 312.

Message duration parameter 414: parameter value indicating, in seconds, the amount of time for which content of the message (e.g., the message image payload 406, message video payload 408, message audio payload 410) is to be presented or made accessible to a user via the interaction client 104.

Message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

Message story identifier 418: identifier values identifying one or more content collections (e.g., "stories" identified in the collections table 318) with which a particular content item in the message image payload 406 of the message 400 is associated. For example, multiple images within the message image payload 406 may each be associated with multiple content collections using identifier values.

Message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

Message sender identifier 422: an identifier (e.g., a messaging system identifier, email address, or device identifier) indicative of a user of the user system 102 on which the message 400 was generated and from which the message 400 was sent.

Message receiver identifier 424: an identifier (e.g., a messaging system identifier, email address, or device identifier) indicative of a user of the user system 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within an image table 316, values stored within the message augmentation data 412 may point to data stored in an augmentation table 312, values stored within the message story identifier 418 may point to data stored in a collections table 318, and values stored within the message sender identifier 422 and the message receiver identifier 424 may point to user records stored within an entity table 308.

Figure 5:
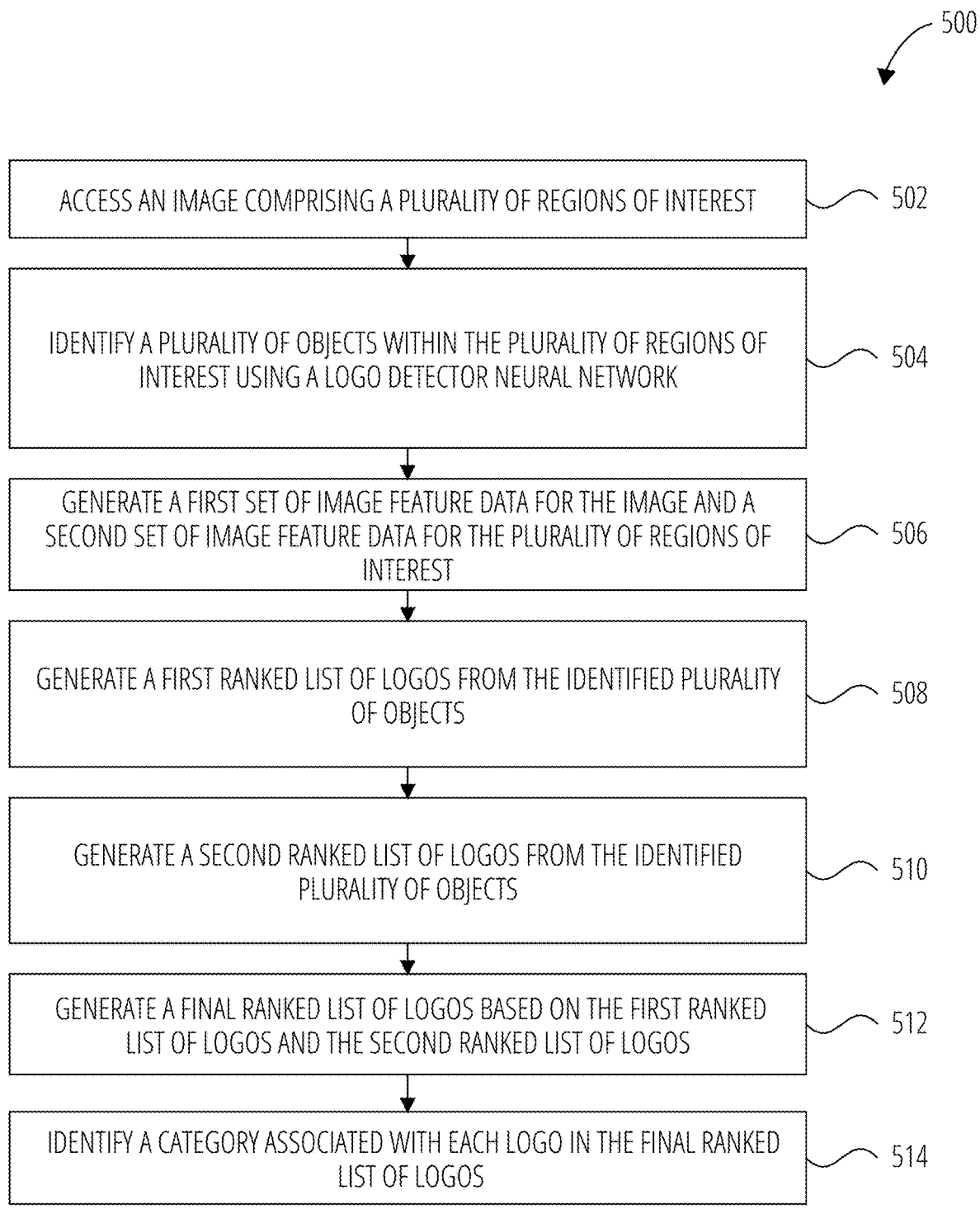
FIG. 5 is a flowchart illustrating a process for building a few-shot logo recognition system, according to some examples.

FIG. 5 is a flowchart illustrating a process 500 for building a few-shot logo recognition system, according to some examples. Although the flowchart may describe the operations as a sequential process, many of the operations may be performed in parallel or concurrently. In addition, the order of the operations may be re-arranged. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems. While certain operations of the process 500 are described as being performed by certain devices, in different examples, different devices or a combination of devices may perform these operations.

In one example, the processor in the logo recognition system 232, the processor in the user systems 102, the processor in the interaction server system 110 or any combination thereof, can perform the operations in process 500. In some examples, the logo recognition system 232 comprises a logo detector, an image feature extractor, a candidate retrieval engine, and a geometric verification system.

At operation 502, the processor accesses an image comprising a plurality of regions of interest. The image may be a single image or a sequence of images (e.g., a video). The regions of interest may include any region which may contain a potential logo image. A logo image may be any combination of a symbol, a graphic, a word, or a name.

At operation 504, the processor identifies a plurality of objects within the plurality of regions of interest using the logo detector neural network. For each object in the plurality of objects, the logo detector neural network is trained to generate an indication that the object is a logo. The logo detector neural network may be used for detecting regions of interest within an input image. A region of interest includes any region with a potential logo image. Each region of interest is represented by a boundary. The logo detector may be a neural network trained to perform object detection tasks. An example architecture includes the YOLOv5 neural network. The logo detector neural network may be trained on a set of logo images (e.g., images stored in the logo table 320). The output of the logo detector neural network may include image pixel coordinates of a boundary encompassing the logo image and a determination of whether the logo image is a true logo image or not. The boundary surrounding the object may be that of a box in the shape of a rectangle or square. The boundary may consist of other shapes such as a circle, triangle, or any other shape. In some examples, the logo detector neural network is trained only using logo images stored in the logo table 320. In some examples, the logo detector neural network is trained on additional logo images that are manually collected from sources, such as the Internet; the total number of images collected from the internet, for example, may be 200,000 images or less.

At operation 506, the processor generates a first set of image feature data for the image and a second set of image feature data for the plurality of regions of interest. The first set of image feature data and the second set of image feature data may be generated by the image feature extractor. In some examples, the image feature extractor is a neural network (e.g., Contrastive Language-Image Pretraining neural network, scale-invariant convolutional neural network). In some examples, the image feature extractor neural network uses pretrained weights.

The first set of image feature data may be global image feature data that is extracted from the entire accessed image. The second set of image feature data may be image feature data extracted from the ROIs that were detected by the logo detector neural network as described in connection with operation 504.

In some examples, generating the first set of image feature data and the second set of image feature data further includes generating a plurality of resized images. For example, the accessed image may be resized at different scales. Each resized image may further be center cropped to generate a plurality of center cropped, resized images. In some examples, center cropping the resized images involves adding an equal amount of padding to the vertical and horizontal sides of the image. Center cropping an image improves performance of the logo recognition system 232 when dealing with images of different resolutions.

Each image in the plurality of center cropped, resized images is provided as input to the image feature extractor. The image feature extractor generates image feature data for each input image. The generated image feature data is normalized using L2 normalization. The normalized feature data for each input image may be aggregated to generate multi-scale image feature data for the entire accessed image or multi-scale image feature data for a given ROI from the plurality of ROIs.

Thus, the image feature extractor generates multi-scale image feature data for the accessed image and for each of the ROIs in the accessed image. The image feature extractor may also generate multi-scale image feature data for the logo images in the logo table 320 using the process described above.

At operation 508, the processor generates a first ranked list of logos from the identified plurality of objects. The first ranked list of logos is generated based on matching the first set of image feature data with image feature data associated with a database of logos. For example, the candidate retrieval engine generates the first ranked list of logos. The database of logos may be the logo image in the logo table 320.

At operation 510, the processor generates a second ranked list of logos from the identified plurality of objects. The second ranked list of logos is based on matching the second set of image feature data with the image feature data associated with the database of logos. For example, the candidate retrieval engine generates the second ranked list of logos. The database of logos may be the logo image in the logo table 320.

To improve search efficiency, image feature data associated with the database of logos may be extracted in advance and the image feature data may be stored offline (e.g., in the image feature table 322).

At operation 512, the processor generates a final ranked list of logos based on the first ranked list of logos and the second ranked list of logos. The final ranked list of logos is generated by merging and sorting the first ranked list of logos and the second ranked list of logos according to feature matching scores. The feature matching scores may be a cosine similarity score. Thus, the final ranked list of logos is obtained using feature data from the identified ROIs and the entire query image.

At operation 514, the processor identifies a category associated with each logo in the final ranked list of logos. The category may include a name or brand name (e.g., a business entity) associated with each logo. The category of the logos in the final ranked list of logos may be retrieved from a database table of logo categories. For example, a first logo in the final ranked list has an identification number and the processor searches the database table to obtain the logo category associated with the identification number.

In some examples, the processor identifies a subset of logos in the final ranked list of logos. The subset of logos may be identified based on having similarity scores outside of a predefined range. The processor determines that the identified subset of logos are false positive logo objects using a geometric verification algorithm and removes the identified subset of logos from the final ranked list of logos in response to determining the identified subset of logos are false positive logo objects.

In some examples, the geometric verification system is used to filter out false positive logo candidates from the final ranked list of logos. Specifically, the geometric verification system extracts features data from both the query image and ROIs (e.g., using Scale Invariant Feature Transform). The geometric verification system matches the extracted features from the query image or the ROIs with the database of logo images. In some examples, the geometric verification system uses a robust estimator such as MAGSAC++ to match the extracted features. The geometric verification system computes a matching score between the query image or ROI and each of the top-k ranked logo candidate images from the final ranked list of logos. The matching score may be computed as the inlier number in some examples.

To suppress false positives, a threshold on the inlier number may be set. If the inlier number exceeds the threshold, then the logo candidate may be considered a true positive, otherwise it may be considered a false positive. To improve computational efficiency, geometric verification may be performed for logo images in the final ranked list of logos with moderate cosine similarity scores. If a logo image has a low cosine similarity score, it may be rejected as a true negative without the need for geometric verification; likewise, if a candidate has a high cosine similarity score, it may be considered a true positive. In an example, a low score may be in the range of 0.70 or lower and may be rejected as a false positive. A high score may be in the range of 0.87 or higher and may be accepted as a true positive. A moderate score may be within a range of 0.70 and 0.87 and may require feedback from the geometric verification system.

In some examples, the logo recognition system 232 may analyze an image accessed from a computer device. The analysis may include identification of a category associated with at least one logo identified in the image. In response to the analysis of the image, the logo recognition system 232 may cause display of an interactive window on a graphical user interface of the computer device. The interactive window may comprise an indication of the category associated with the at least one logo that was identified in the image. For example, the interactive window may provide more information about the business entity associated with the logo and may further link to third-party websites or applications to view and purchase products associated with the business entity.

Figure 6A:
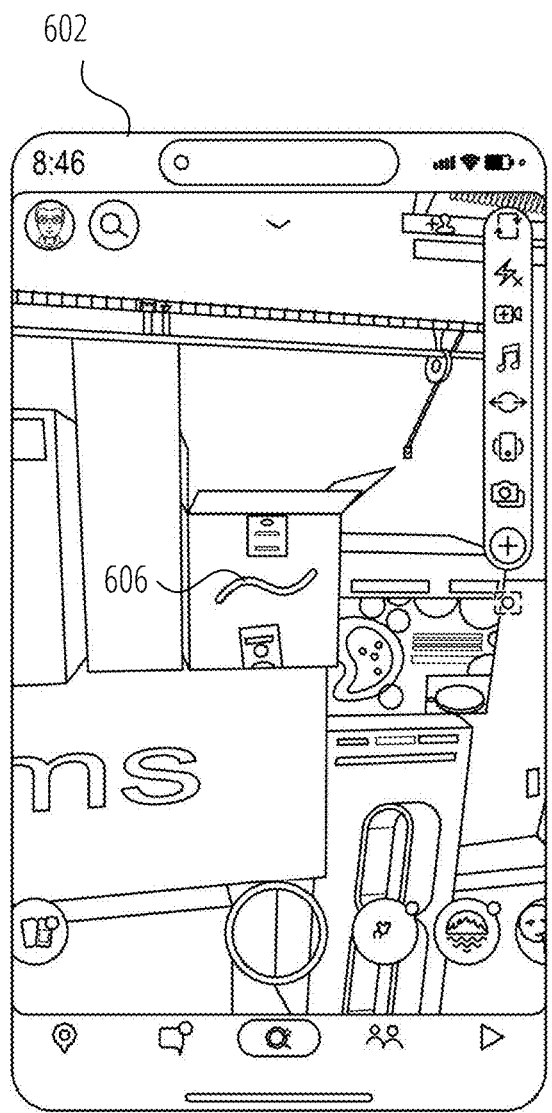
FIGS. 6A-6B illustrate example user interfaces associated with the logo recognition system, according to some examples.

FIG. 6A is an illustration of a user interface 602 of a mobile computing device. The user interface 600 is shown to include a logo object 606. The logo object 606 may be identified and categorized using the logo recognition system 232.

Figure 6B:
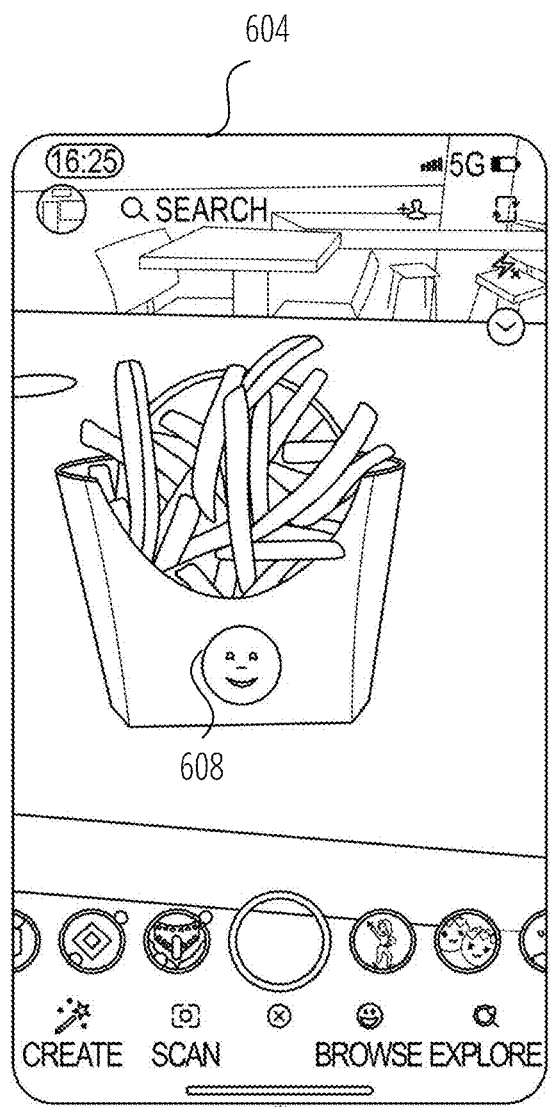

FIG. 6B is an illustration of a user interface 604 of a mobile computing device. The user interface 604 is shown to include a logo object 608. The logo object 608 may be identified and categorized using the logo recognition system 232.

FIG. 7A illustrates example operation of the logo recognition system 232 identifying a true positive logo, according to some examples. The logo recognition system 232 identifies a logo 702 and places a boundary box 704 around the identified logo. Logo image 708 is an example logo image stored in the database of logo images (e.g., logo table 320). The logo recognition system may determine that the logo 702 and the logo image 708 have a high similarity score and thus is a true positive logo candidate.

FIG. 7B illustrates example operation of the logo recognition system 232 identifying a false positive logo, according to example embodiments. The logo recognition system identifies a logo 710. Logo image 706 is an example logo image stored in the database of logo images (e.g., logo table 320). The logo recognition system may determine that the logo 710 and the logo image 706 have a very low similarity score and thus is a false positive logo candidate.

In some examples, if the logo recognition system 232 determined that the identified logo images and the corresponding matched database logo image have a moderate similarity score, the logo recognition system 232 may employ geometric verification processes as described above.

Figure 8:
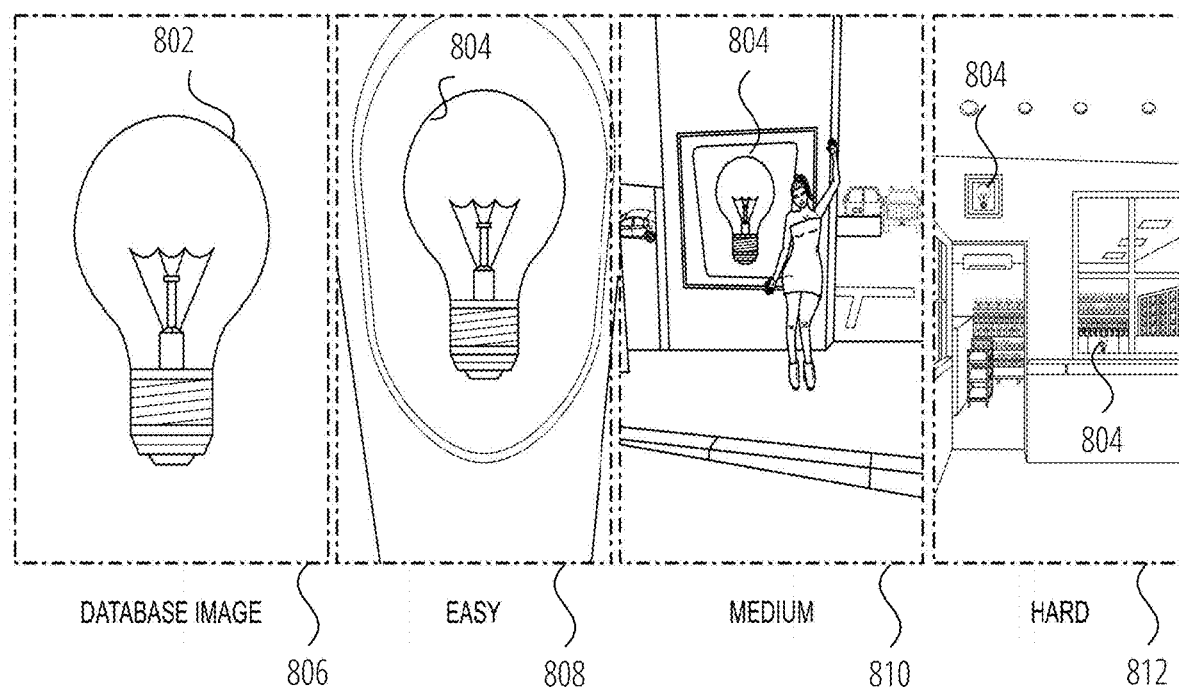
FIG. 8 illustrates captured images with identified logos in varying scales, according to some examples.

FIG. 8 is an illustration of a logo pictured in different images from varying scales, according to some examples. Identifying and verifying logos is a special task with its own unique challenges. Logos are sometimes feature-scarce and the appearance of the logo may vary drastically in real-world images due to lighting effects, distance, quality, and other barriers that prevent the logo appearance from being clearly captured. Image 806 is a database image showing a logo image 802. Image 808 is a first image captured by a computing device showing a logo image 804. As shown in the image 808, the logo image 804 is clearly captured and very visible from within the image 808. Image 810 is a second image captured by a computing device showing the logo image 804. Relative to the image 808, the logo image 804 is not as easily noticeable in the image 810. Image 812 is a third image captured by a computing device showing the logo image 804 in multiple regions of the image. The logo image 804 is very difficult to detect in the image 812 relative to images 808 and 810. Thus, by use of the logo detector neural network, the image feature extractor, candidate retrieval engine and geometric verification system, the logo recognition system 232 is able to accurately identify logos of varying distances and varying scale.

System with Head-Wearable Apparatus

Figure 9:
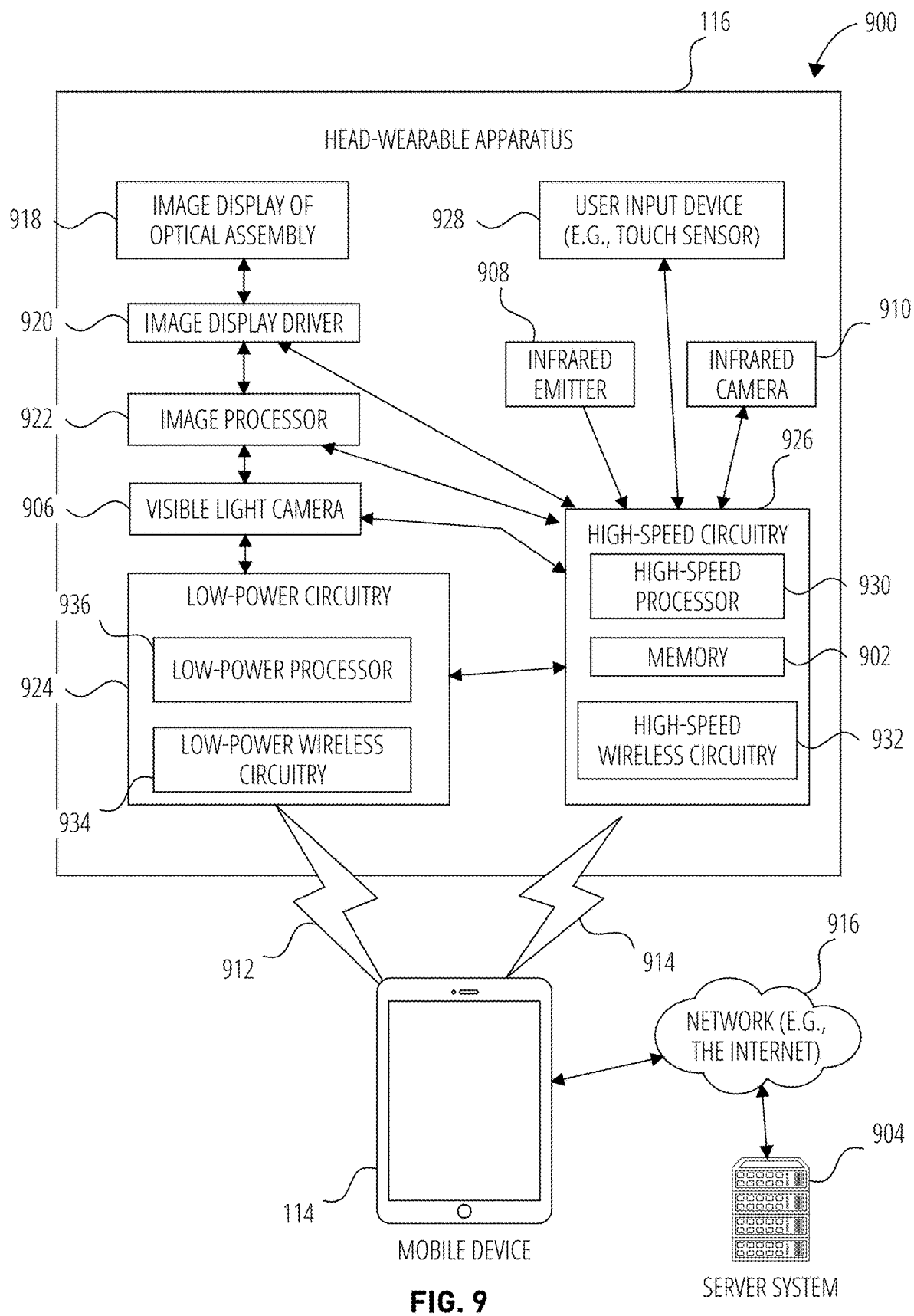
FIG. 9 illustrates a system including a head-wearable apparatus, according to some examples.

FIG. 9 illustrates a system 900 including a head-wearable apparatus 116 with a selector input device, according to some examples. FIG. 9 is a high-level functional block diagram of an example head-wearable apparatus 116 communicatively coupled to a mobile device 114 and various server systems 904 (e.g., the interaction server system 110) via various networks 108.

The head-wearable apparatus 116 includes one or more cameras, each of which may be, for example, a visible light camera 906, an infrared emitter 908, and an infrared camera 910.

The mobile device 114 connects with head-wearable apparatus 116 using both a low-power wireless connection 912 and a high-speed wireless connection 914. The mobile device 114 is also connected to the server system 904 and the network 916.

The head-wearable apparatus 116 further includes two image displays of the image display of optical assembly 918. The two image displays of optical assembly 918 include one associated with the left lateral side and one associated with the right lateral side of the head-wearable apparatus 116. The head-wearable apparatus 116 also includes an image display driver 920, an image processor 922, low-power circuitry 924, and high-speed circuitry 926. The image display of optical assembly 918 is for presenting images and videos, including an image that may include a graphical user interface to a user of the head-wearable apparatus 116.

The image display driver 920 commands and controls the image display of optical assembly 918. The image display driver 920 may deliver image data directly to the image display of optical assembly 918 for presentation or may convert the image data into a signal or data format suitable for delivery to the image display device. For example, the image data may be video data formatted according to compression formats, such as H.264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (EXIF) or the like.

The head-wearable apparatus 116 includes a frame and stems (or temples) extending from a lateral side of the frame. The head-wearable apparatus 116 further includes a user input device 928 (e.g., touch sensor or push button), including an input surface on the head-wearable apparatus 116. The user input device 928 (e.g., touch sensor or push button) is to receive from the user an input selection to manipulate the graphical user interface of the presented image.

The components shown in FIG. 9 for the head-wearable apparatus 116 are located on one or more circuit boards, for example a PCB or flexible PCB, in the rims or temples. Alternatively, or additionally, the depicted components may be located in the chunks, frames, hinges, or bridge of the head-wearable apparatus 116. Left and right visible light cameras 906 may include digital camera elements such as a complementary metal oxide-semiconductor (CMOS) image sensor, charge-coupled device, camera lenses, or any other respective visible or light-capturing elements that may be used to capture data, including images of scenes with unknown objects.

The head-wearable apparatus 116 includes a memory 902, which stores instructions to perform a subset or all of the functions described herein. The memory 902 may also include storage device.

As shown in FIG. 9, the high-speed circuitry 926 includes a high-speed processor 930, a memory 902, and high-speed wireless circuitry 932. In some examples, the image display driver 920 is coupled to the high-speed circuitry 926 and operated by the high-speed processor 930 in order to drive the left and right image displays of the image display of optical assembly 918. The high-speed processor 930 may be any processor capable of managing high-speed communications and operation of any general computing system needed for the head-wearable apparatus 116. The high-speed processor 930 includes processing resources needed for managing high-speed data transfers on a high-speed wireless connection 914 to a wireless local area network (WLAN) using the high-speed wireless circuitry 932. In certain examples, the high-speed processor 930 executes an operating system such as a LINUX operating system or other such operating system of the head-wearable apparatus 116, and the operating system is stored in the memory 902 for execution. In addition to any other responsibilities, the high-speed processor 930 executing a software architecture for the head-wearable apparatus 116 is used to manage data transfers with high-speed wireless circuitry 932. In certain examples, the high-speed wireless circuitry 932 is configured to implement Institute of Electrical and Electronic Engineers (IEEE) 802.11 communication standards, also referred to herein as WI-FI®. In some examples, other high-speed communications standards may be implemented by the high-speed wireless circuitry 932.

The low-power wireless circuitry 934 and the high-speed wireless circuitry 932 of the head-wearable apparatus 116 may include short-range transceivers (Bluetooth™) and wireless wide, local, or wide area network transceivers (e.g., cellular or WI-FI®). Mobile device 114, including the transceivers communicating via the low-power wireless connection 912 and the high-speed wireless connection 914, may be implemented using details of the architecture of the head-wearable apparatus 116, as may other elements of the network 916.

The memory 902 includes any storage device capable of storing various data and applications, including, among other things, camera data generated by the left and right visible light cameras 906, the infrared camera 910, and the image processor 922, as well as images generated for display by the image display driver 920 on the image displays of the image display of optical assembly 918. While the memory 902 is shown as integrated with high-speed circuitry 926, in some examples, the memory 902 may be an independent standalone element of the head-wearable apparatus 116. In certain such examples, electrical routing lines may provide a connection through a chip that includes the high-speed processor 930 from the image processor 922 or the low-power processor 936 to the memory 902. In some examples, the high-speed processor 930 may manage addressing of the memory 902 such that the low-power processor 936 will boot the high-speed processor 930 any time that a read or write operation involving memory 902 is needed.

As shown in FIG. 9, the low-power processor 936 or high-speed processor 930 of the head-wearable apparatus 116 may be coupled to the camera (visible light camera 906, infrared emitter 908, or infrared camera 910), the image display driver 920, the user input device 928 (e.g., touch sensor or push button), and the memory 902.

The head-wearable apparatus 116 is connected to a host computer. For example, the head-wearable apparatus 116 is paired with the mobile device 114 via the high-speed wireless connection 914 or connected to the server system 904 via the network 916. The server system 904 may be one or more computing devices as part of a service or network computing system, for example, that includes a processor, a memory, and network communication interface to communicate over the network 916 with the mobile device 114 and the head-wearable apparatus 116.

The mobile device 114 includes a processor and a network communication interface coupled to the processor. The network communication interface allows for communication over the network 916, low-power wireless connection 912, or high-speed wireless connection 914. Mobile device 114 may further store at least portions of the instructions in the memory of the mobile device 114 memory to implement the functionality described herein.

Output components of the head-wearable apparatus 116 include visual components, such as a display such as a liquid crystal display (LCD), a plasma display panel (PDP), a light-emitting diode (LED) display, a projector, or a waveguide. The image displays of the optical assembly are driven by the image display driver 920. The output components of the head-wearable apparatus 116 further include acoustic components (e.g., speakers), haptic components (e.g., a vibratory motor), other signal generators, and so forth. The input components of the head-wearable apparatus 116, the mobile device 114, and server system 904, such as the user input device 928, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 116 may also include additional peripheral device elements. Such peripheral device elements may include biometric sensors, additional sensors, or display elements integrated with the head-wearable apparatus 116. For example, peripheral device elements may include any I/O components including output components, motion components, position components, or any other such elements described herein.

For example, the biometric components include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The biometric components may include a brain-machine interface (BMI) system that allows communication between the brain and an external device or machine. This may be achieved by recording brain activity data, translating this data into a format that may be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), Wi-Fi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates may also be received over low-power wireless connections 912 and high-speed wireless connection 914 from the mobile device 114 via the low-power wireless circuitry 934 or high-speed wireless circuitry 932.

Machine Architecture

Figure 10:
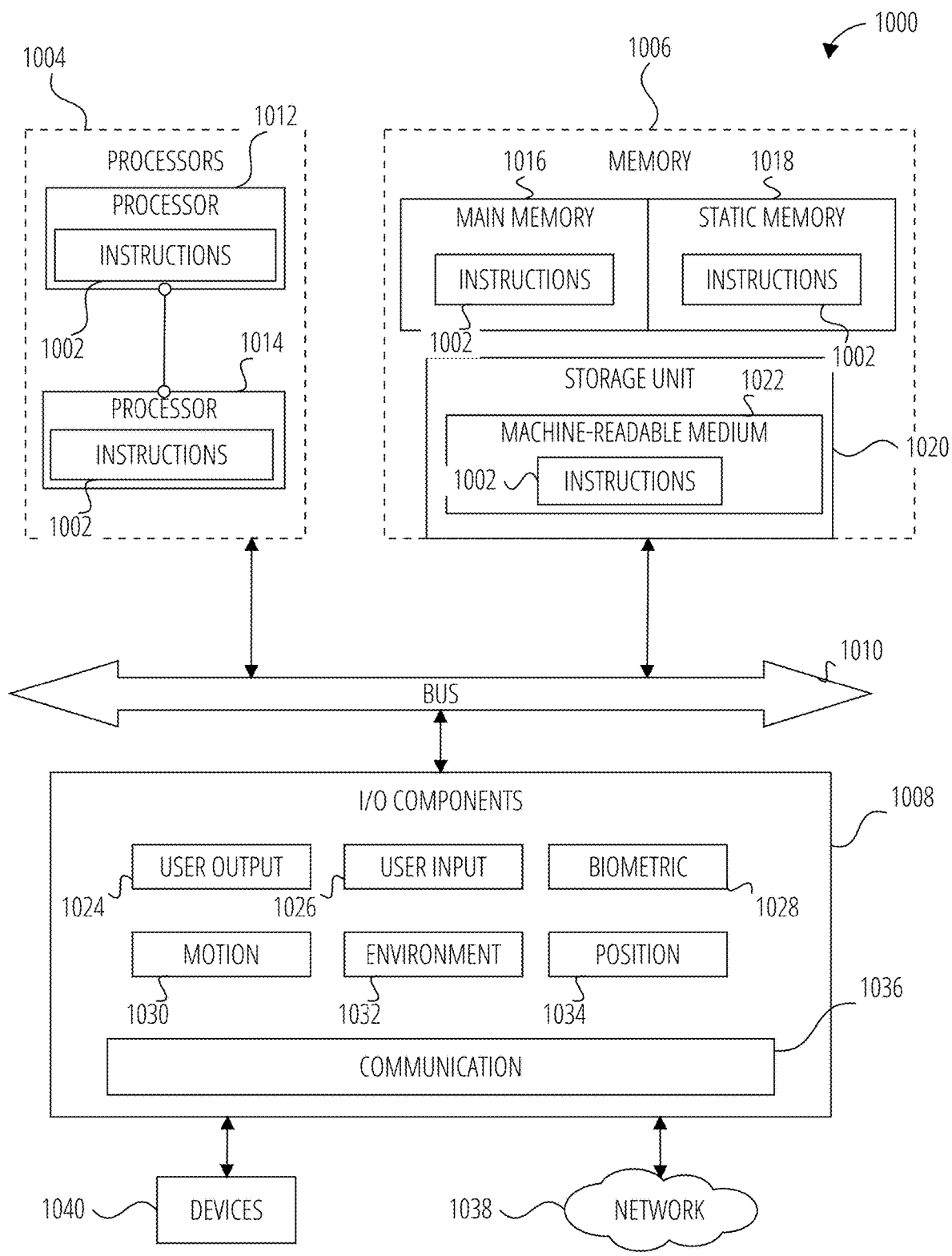
FIG. 10 is a diagrammatic representation of a machine in the form of a computer system within which a set of instructions may be executed to cause the machine to perform any one or more of the methodologies discussed herein, according to some examples.

FIG. 10 is a diagrammatic representation of the machine 1000 within which instructions 1002 (e.g., software, a program, an application, an applet, an app, or other executable code) for causing the machine 1000 to perform any one or more of the methodologies discussed herein may be executed. For example, the instructions 1002 may cause the machine 1000 to execute any one or more of the methods described herein. The instructions 1002 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1002, sequentially or otherwise, that specify actions to be taken by the machine 1000. Further, while a single machine 1000 is illustrated, the term "machine" shall also be taken to include a collection of machines that individually or jointly execute the instructions 1002 to perform any one or more of the methodologies discussed herein. The machine 1000, for example, may comprise the user system 102 or any one of multiple server devices forming part of the interaction server system 110. In some examples, the machine 1000 may also comprise both client and server systems, with certain operations of a particular method or algorithm being performed on the server-side and with certain operations of the particular method or algorithm being performed on the client-side.

The machine 1000 may include processors 1004, memory 1006, and input/output I/O components 1008, which may be configured to communicate with each other via a bus 1010. In an example, the processors 1004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1012 and a processor 1014 that execute the instructions 1002. The term "processor" is intended to include multi-core processors that may comprise two or more independent processors (sometimes referred to as "cores") that may execute instructions contemporaneously. Although FIG. 10 shows multiple processors 1004, the machine 1000 may include a single processor with a single-core, a single processor with multiple cores (e.g., a multi-core processor), multiple processors with a single core, multiple processors with multiples cores, or any combination thereof.

The memory 1006 includes a main memory 1016, a static memory 1018, and a storage unit 1020, both accessible to the processors 1004 via the bus 1010. The main memory 1006, the static memory 1018, and storage unit 1020 store the instructions 1002 embodying any one or more of the methodologies or functions described herein. The instructions 1002 may also reside, completely or partially, within the main memory 1016, within the static memory 1018, within machine-readable medium 1022 within the storage unit 1020, within at least one of the processors 1004 (e.g., within the processor's cache memory), or any suitable combination thereof, during execution thereof by the machine 1000.

The I/O components 1008 may include a wide variety of components to receive input, provide output, produce output, transmit information, exchange information, capture measurements, and so on. The specific I/O components 1008 that are included in a particular machine will depend on the type of machine. For example, portable machines such as mobile phones may include a touch input device or other such input mechanisms, while a headless server machine will likely not include such a touch input device. It will be appreciated that the I/O components 1008 may include many other components that are not shown in FIG. 10. In various examples, the I/O components 1008 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1008 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure bio signals (e.g., blood pressure, heart rate, body temperature, perspiration, or brain waves), identify a person (e.g., voice identification, retinal identification, facial identification, fingerprint identification, or electroencephalogram-based identification), and the like. The biometric components may include a brain-machine interface (BMI) system that allows communication between the brain and an external device or machine. This may be achieved by recording brain activity data, translating this data into a format that may be understood by a computer, and then using the resulting signals to control the device or machine.

Example types of BMI technologies, including:
Electroencephalography (EEG) based BMIs, which record electrical activity in the brain using electrodes placed on the scalp.
Invasive BMIs, which used electrodes that are surgically implanted into the brain.
Optogenetics BMIs, which use light to control the activity of specific nerve cells in the brain.

Any biometric data collected by the biometric components is captured and stored only with user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the data is not shared or sold to any third party without the explicit consent of the user. In addition, appropriate technical and organizational measures are implemented to ensure the security and confidentiality of this sensitive information.

The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the user system 102 may have a camera system comprising, for example, front cameras on a front surface of the user system 102 and rear cameras on a rear surface of the user system 102. The front cameras may, for example, be used to capture still images and video of a user of the user system 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the user system 102 may also include a 360° camera for capturing 360° photographs and videos.

Further, the camera system of the user system 102 may include dual rear cameras (e.g., a primary camera as well as a depth-sensing camera), or even triple, quad or penta rear camera configurations on the front and rear sides of the user system 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1008 further include communication components 1036 operable to couple the machine 1000 to a network 1038 or devices 1040 via respective coupling or connections. For example, the communication components 1036 may include a network interface component or another suitable device to interface with the network 1038. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1040 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph™, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1016, static memory 1018, and memory of the processors 1004) and storage unit 1020 may store one or more sets of instructions and data structures (e.g., software) embodying or used by any one or more of the methodologies or functions described herein. These instructions (e.g., the instructions 1002), when executed by processors 1004, cause various operations to implement the disclosed examples.

The instructions 1002 may be transmitted or received over the network 1038, using a transmission medium, via a network interface device (e.g., a network interface component included in the communication components 1036) and using any one of several well-known transfer protocols (e.g., hypertext transfer protocol (HTTP)). Similarly, the instructions 1002 may be transmitted or received using a transmission medium via a coupling (e.g., a peer-to-peer coupling) to the devices 1040.

Software Architecture

Figure 11:
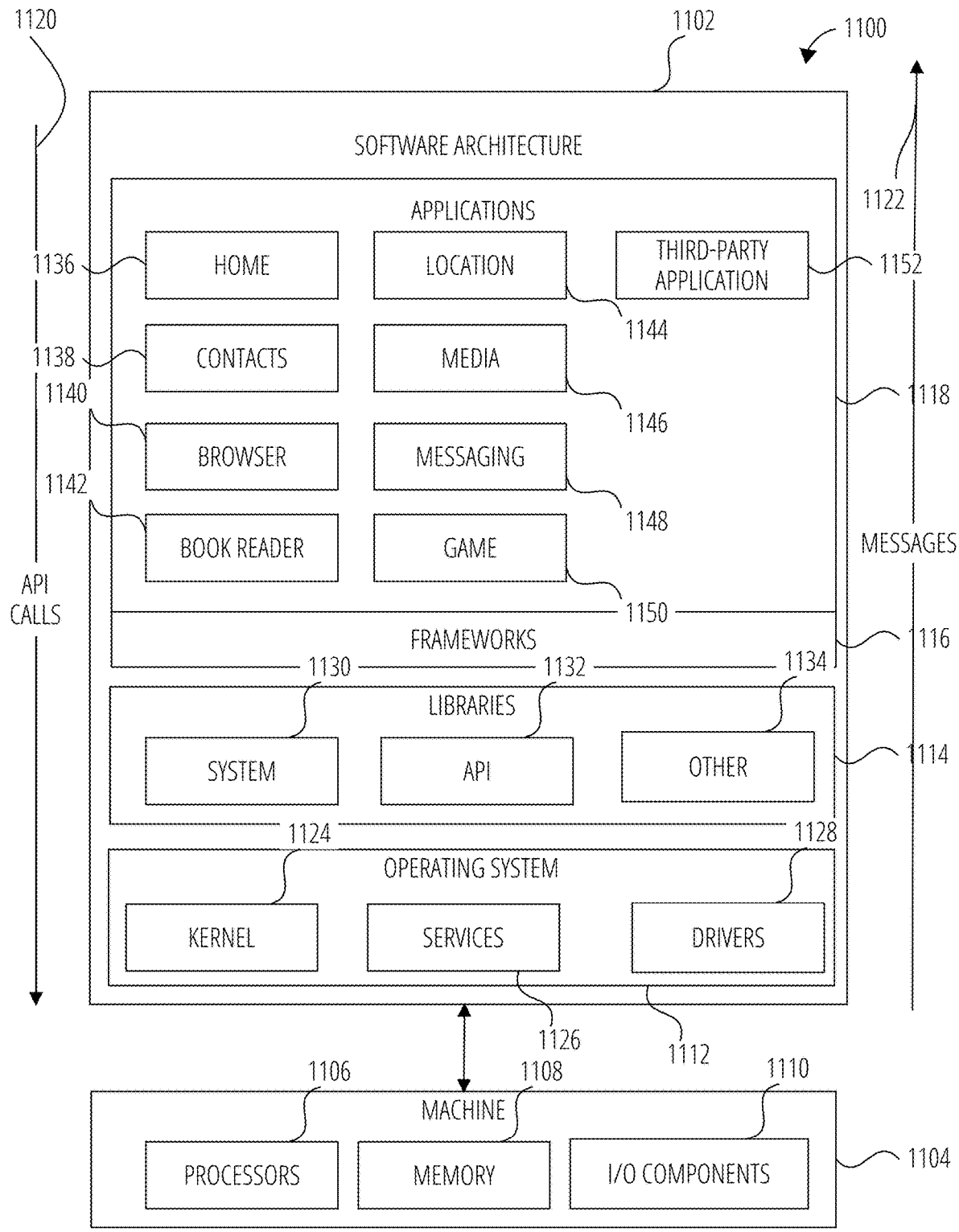
FIG. 11 is a block diagram showing a software architecture within which examples may be implemented.

FIG. 11 is a block diagram 1100 illustrating a software architecture 1102, which may be installed on any one or more of the devices described herein. The software architecture 1102 is supported by hardware such as a machine 1104 that includes processors 1106, memory 1108, and I/O components 1110. In this example, the software architecture 1102 may be conceptualized as a stack of layers, where each layer provides a particular functionality.

The software architecture 1102 includes layers such as an operating system 1112, libraries 1114, frameworks 1116, and applications 1118. Operationally, the applications 1118 invoke API calls 1120 through the software stack and receive messages 1122 in response to the API calls 1120.

The operating system 1112 manages hardware resources and provides common services. The operating system 1112 includes, for example, a kernel 1124, services 1126, and drivers 1128. The kernel 1124 acts as an abstraction layer between the hardware and the other software layers. For example, the kernel 1124 provides memory management, processor management (e.g., scheduling), component management, networking, and security settings, among other functionalities. The services 1126 may provide other common services for the other software layers. The drivers 1128 are responsible for controlling or interfacing with the underlying hardware. For instance, the drivers 1128 may include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1118. The libraries 1114 may include system libraries 1130 (e.g., C standard library) that provide functions such as memory allocation functions, string manipulation functions, mathematic functions, and the like. In addition, the libraries 1114 may include API libraries 1132 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 may also include a wide variety of other libraries 1134 to provide many other APIs to the applications 1118.

The frameworks 1116 provide a common high-level infrastructure that is used by the applications 1118. For example, the frameworks 1116 provide various graphical user interface (GUI) functions, high-level resource management, and high-level location services. The frameworks 1116 may provide a broad spectrum of other APIs that may be used by the applications 1118, some of which may be specific to a particular operating system or platform.

In an example, the applications 1118 may include a home application 1136, a contacts application 1138, a browser application 1140, a book reader application 1142, a location application 1144, a media application 1146, a messaging application 1148, a game application 1150, and a broad assortment of other applications such as a third-party application 1152. The applications 1118 are programs that execute functions defined in the programs. Various programming languages may be employed to create one or more of the applications 1118, structured in a variety of manners, such as object-oriented programming languages (e.g., Objective-C, Java, or C++) or procedural programming languages (e.g., C or assembly language). In a specific example, the third-party application 1152 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1152 may invoke the API calls 1120 provided by the operating system 1112 to facilitate functionalities described herein.

Example 1 is a system for few-shot logo recognition including one or more processors. The system includes at least one memory component storing instructions that, when executed by the one or more processors, cause the one or more processors to perform certain operations. The system operations include accessing an image comprising a plurality of regions of interest. The system operations also include identifying a plurality of objects within the plurality of regions of interest using a logo detector neural network. For each object of the plurality of objects, the logo detector neural network is trained to generate an indication that the object is a logo. The system operations include generating a first set of image feature data for the image and a second set of image feature data for the plurality of regions of interest. The system operations also include generating a first ranked list of logos from the identified plurality of objects. The first ranked list of logos is generated based on matching the first set of image feature data with image feature data associated with a database of logos. The system operations further include generating a second ranked list of logos from the identified plurality of objects. The second ranked list of logos is based on matching the second set of image feature data with the image feature data associated with the database of logos. The system operations also include generating a final ranked list of logos based on the first ranked list of logos and the second ranked list of logos. The system operations include identifying a category associated with each logo in the final ranked list of logos.

In Example 2, the system of Example 1, wherein each logo in the final ranked list of logos is associated with a similarity score. The system operations further include identifying a subset of logos in the final ranked list of logos. The subset of logos is identified based on having similarity scores outside of a predefined range. The system operations also include determining that the identified subset of logos are false positive logo objects using a geometric verification algorithm. The system operations include in response to determining the identified subset of logos are false positive logo objects, removing the identified subset of logos from the final ranked list of logos.

In Example 3, the system of Example 2 wherein the similarity score is a cosine similarity score.

In Example 4, the system of Examples 1-3, wherein the generating the first set of image feature data for the image further includes generating a plurality of cropped images. The cropped images generated by cropping each region of the plurality of regions from the image. The system operations further include for each cropped image, providing the cropped image as input to a feature extractor neural network trained to generate a plurality of resized images, each image in the plurality of resized images resized at a different scale. The feature extractor neural network is further trained to center crop each image in the plurality of resized images. The feature extractor neural network is trained to generate a plurality of normalized resized images from the plurality of resized images and generate image feature data for each image in the plurality of normalized resized images. The feature extractor neural network is further trained to generate first multi-scale image feature data for each image by aggregating the image feature data for each image in the plurality of normalized resized images.

In Example 5, the system of Examples 1-4, wherein the logo detector neural network is further trained to generate a set of pixel coordinates representing a boundary of the object.

In Example 6, the system of Examples 1-5, wherein the generating the second set of image feature data further includes, for each region of interest of the plurality of regions of interest: generating a plurality of cropped images, the cropped images generated by cropping portions of the region of interest. The system operations further including for each cropped image, providing the cropped image as input to a feature extractor neural network trained to generate a plurality of resized images, each image in the plurality of resized images resized at a different scale. The feature extractor neural network is further trained to center crop each image in the plurality of resized images and generate a plurality of normalized resized images from the plurality of resized images. The feature extractor neural network is trained to generate image feature data for each image in the plurality of normalized resized images. The feature extractor neural network is further trained to generate second multi-scale image feature data for each region of interest by aggregating the image feature data for each image in the plurality of normalized resized images.

In Example 7, the system of Examples 1-6, wherein the logo comprises at least one of a symbol, word, or name.

In Example 8, the system of Examples 1-7, wherein the database of logos comprises at least one manually labeled logo image.

In Example 9, the system of Examples 1-8, wherein the system operations further include accessing a second image from a computer device. The system operations further include analyzing a second image, wherein the analysis comprises an identification of a category associated with at least one logo identified in the second image. The system operations further include in response to analyzing the second image, causing display of an interactive window on a graphical user interface of the computer device. The interactive window comprising an indication of the category associated with the at least one logo identified in the second image.

Example 10 is a method for implementing any one of Examples 1-9 to perform operations for recognizing logos. The method includes accessing, by one or more processors, an image comprising a plurality of regions of interest. The method also includes identifying, by the one or more processors, a plurality of objects within the plurality of regions of interest using the logo detector neural network. For each object of the plurality of objects, the logo detector neural network is trained to generate an indication that the object is a logo. The method includes generating a first set of image feature data for the image and a second set of image feature data for the plurality of regions of interest. The method also includes generating a first ranked list of logos from the identified plurality of objects. The first ranked list of logos is generated based on matching the first set of image feature data with image feature data associated with a database of logos. The method includes generating a second ranked list of logos from the identified plurality of objects. The second ranked list of logos is based on matching the second set of image feature data with the image feature data associated with the database of logos. The method also includes generating a final ranked list of logos based on the first ranked list of logos and the second ranked list of logos. The method includes identifying a category associated with each logo in the final ranked list of logos.

In Example 11, the method for implementing any one of Examples 1-10, wherein each logo in the final ranked list of logos is associated with a similarity score. The method further including identifying a subset of logos in the final ranked list of logos. The subset of logos is identified based on having similarity scores outside of a predefined range. The method also includes determining that the identified subset of logos are false positive logo objects using a geometric verification algorithm. The method includes in response to determining the identified subset of logos are false positive logo objects, removing the identified subset of logos from the final ranked list of logos.

In Example 12, the method for implementing Examples 1-11, wherein the similarity score is a cosine similarity score.

In Example 13, the method for implementing any one of Examples 1-12, wherein generating the first set of image feature data for the image further includes generating a plurality of cropped images. The cropped images generated by cropping each region of the plurality of regions from the image. The method further includes for each cropped image, providing the cropped image as input to a feature extractor neural network trained to generate a plurality of resized images, each image in the plurality of resized images resized at a different scale. The feature extractor neural network also trained to center crop each image in the plurality of resized images. The neural network trained to generate a plurality of normalized resized images from the plurality of resized images and generate image feature data for each image in the plurality of normalized resized images. The feature extractor neural network also trained to generate first multi-scale image feature data for the image by aggregating the image feature data for each image in the plurality of normalized resized images.

In Example 14, the method for implementing any one of Examples 1-13, wherein the logo detector neural network is further trained to generate a set of pixel coordinates representing a boundary of the object.

In Example 15, the method for implementing any one of Examples 1-14, wherein generating the second set of image feature data for each region of interest in the plurality of regions of interest further includes, for each region of interest: generating a plurality of cropped images, the cropped images generated by cropping portions of the image. The system operations further include for each cropped image, providing the cropped image as input to a feature extractor neural network trained to generate a plurality of resized images, each image in the plurality of resized images resized at a different scale. The feature extractor neural network further trained to center crop each image in the plurality of resized images and generate a plurality of normalized resized images from the plurality of resized images. The feature extractor neural network further trained to generate image feature data for each image in the plurality of normalized resized images. The feature extractor neural network is further trained to generate second multi-scale image feature data for each region of interest by aggregating the image feature data for each image in the plurality of normalized resized images.

In Example 16, the method for implementing any one of Examples 1-15, wherein the logo comprises at least one of a symbol, word, or name.

In Example 17, the method for implementing any one of Examples 1-16, wherein the database of logos comprises at least one manually labeled logo image.

In Example 18, the method for implementing any one of Examples 1-17, wherein the database of logos comprises a set of retrieved logo images, the set of retrieved logo images generated by providing the at least one manually labeled logo image as a query input to a database of images, and based on the query input, identifying visually similar images to the query input.

In Example 19, the method for implementing any one of Examples 1-18, wherein the method further includes accessing a second image from a computer device. The method further includes analyzing second image, wherein the analysis comprises an identification of a category associated with at least one logo identified in the second image. The method includes in response to analyzing the second image, causing display of an interactive window on a graphical user interface of the computer device. The interactive window comprising an indication of the category associated with the at least one logo identified in the second image.

Example 20 is a non-transitory computer-readable storage medium storing instructions that, when executed by at least one processor, cause the at least one processor to perform operations for recognizing logos. The system operations include accessing an image comprising a plurality of regions of interest. The system operations also include identifying a plurality of objects within the plurality of regions of interest using a logo detector neural network. For each object of the plurality of objects, the logo detector neural network is trained to generate an indication that the object is a logo. The system operations include generating a first set of image feature data for the image and a second set of image feature data for the plurality of regions of interest. The system operations also include generating a first ranked list of logos from the identified plurality of objects. The first ranked list of logos is generated based on matching the first set of image feature data with image feature data associated with a database of logos. The system operations include generating a second ranked list of logos from the identified plurality of objects. The second ranked list of logos is based on matching the second set of image feature data with the image feature data associated with the database of logos. The system operations also include generating a final ranked list of logos based on the first ranked list of logos and the second ranked list of logos. The system operations include identifying a category associated with each logo in the final ranked list of logos.

Glossary

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components may provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and may operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers, for example, to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers, for example, to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

"User device" refers, for example, to a device accessed, controlled or owned by a user and with which the user interacts perform an action or interaction on the user device, including an interaction with other users or computer systems.

What is claimed is:

1. A system for few-shot logo recognition comprising:
   one or more processors;
   at least one memory component storing instructions that, when executed by the one or more processors, cause the one or more processors to perform operations comprising:
      accessing an image comprising a plurality of regions of interest;
      identifying a plurality of objects within the plurality of regions of interest using a logo detector neural network, wherein for each object of the plurality of objects, the logo detector neural network is trained to generate an indication that the object is a logo;
      generating a first set of image feature data for the image and a second set of image feature data for the plurality of regions of interest;
      generating a first ranked list of logos from the identified plurality of objects, the first ranked list of logos generated based on matching the first set of image feature data with image feature data associated with a database of logos;
      generating a second ranked list of logos from the identified plurality of objects, the second ranked list of logos based on matching the second set of image feature data with the image feature data associated with the database of logos;
      generating a final ranked list of logos based on the first ranked list of logos and the second ranked list of logos; and
      identifying a category associated with each logo in the final ranked list of logos.

2. The system of claim 1, wherein each logo in the final ranked list of logos is associated with a similarity score, the operations further comprising:
   identifying a subset of logos in the final ranked list of logos, the subset of logos identified based on having similarity scores outside of a predefined range;
   determining that the identified subset of logos are false positive logo objects using a geometric verification algorithm; and
   in response to determining the identified subset of logos are false positive logo objects, removing the identified subset of logos from the final ranked list of logos.

3. The system of claim 2, wherein the similarity score is a cosine similarity score.

4. The system of claim 1, wherein the generating the first set of image feature data for the image further comprises:
   generating a plurality of cropped images, the cropped images generated by cropping each region of the plurality of regions from the image;
   for each cropped image, providing the cropped image as input to a feature extractor neural network trained to:
      generate a plurality of resized images, each image in the plurality of resized images resized at a different scale;
      center crop each image in the plurality of resized images;
      generate a plurality of normalized resized images from the plurality of resized images; and
      generate image feature data for each image in the plurality of normalized resized images; and generating first multi-scale image feature data for the image by aggregating the image feature data for each image in the plurality of normalized resized images.

5. The system of claim 1, wherein the logo detector neural network is further trained to generate a set of pixel coordinates representing a boundary of the object.

6. The system of claim 1, wherein the generating the second set of image feature data for the plurality of regions of interest further comprises:
for each region of interest in the plurality of regions of interest:
generating a plurality of cropped images, the cropped images generated by cropping portions of the region of interest;
for each cropped image, providing the cropped image as input to a feature extractor neural network trained to:
generate a plurality of resized images, each image in the plurality of resized images resized at a different scale;
center crop each image in the plurality of resized images;
generate a plurality of normalized resized images from the plurality of resized images; and
generate image feature data for each image in the plurality of normalized resized images; and
generating second multi-scale image feature data for each region of interest by aggregating the image feature data for each image in the plurality of normalized resized images.

7. The system of claim 1, wherein the logo comprises at least one of a symbol, word, or name.

8. The system of claim 1, wherein the database of logos comprises at least one manually labeled logo image.

9. The system of claim 1, wherein the operations further comprise:
accessing a second image from a computer device;
analyzing the second image, the analysis comprising an identification of a category associated with at least one logo identified in the second image; and
in response to analyzing the second image, causing display of an interactive window on a graphical user interface of the computer device, the interactive window comprising an indication of the category associated with the at least one logo identified second image.

10. A method for few-shot logo recognition comprising:
accessing, by one or more processors, an image comprising a plurality of regions of interest;
identifying, by the one or more processors, a plurality of objects within the plurality of regions of interest using a logo detector neural network, wherein for each object of the plurality of objects, the logo detector neural network is trained to generate an indication that the object is a logo;
generating a first set of image feature data for the image and a second set of image feature data for the plurality of regions of interest;
generating a first ranked list of logos from the identified plurality of objects, the first ranked list of logos generated based on matching the first set of image feature data with image feature data associated with a database of logos;
generating a second ranked list of logos from the identified plurality of objects, the second ranked list of logos based on matching the second set of image feature data with the image feature data associated with the database of logos;

generating a final ranked list of logos based on the first ranked list of logos and the second ranked list of logos; and
identifying a category associated with each logo in the final ranked list of logos.

11. The method of claim 10, wherein each logo in the final ranked list of logos is associated with a similarity score, the method further comprising:
identifying a subset of logos in the final ranked list of logos, the subset of logos identified based on having similarity scores outside of a predefined range;
determining that the identified subset of logos are false positive logo objects using a geometric verification algorithm; and
in response to determining the identified subset of logos are false positive logo objects, removing the identified subset of logos from the final ranked list of logos.

12. The method of claim 11, wherein the similarity score is a cosine similarity score.

13. The method of claim 10, wherein generating the first set of image feature data for the image comprises:
generating a plurality of cropped images, the cropped images generated by cropping each region of the plurality of regions from the image;
for each cropped image, providing the cropped image as input to a feature extractor neural network trained to:
generate a plurality of resized images, each image in the plurality of resized images resized at a different scale;
center crop each image in the plurality of resized images;
generate a plurality of normalized resized images from the plurality of resized images; and
generate image feature data for each image in the plurality of normalized resized images; and
generating first multi-scale image feature data for the image by aggregating the image feature data for each image in the plurality of normalized resized images.

14. The method of claim 10, wherein the logo detector neural network is further trained to generate a set of pixel coordinates representing a boundary of the object.

15. The method of claim 10, wherein generating the second set of image feature data for the plurality of regions of interest comprises:
for each region of interest in the plurality of regions of interest:
generating a plurality of cropped images, the cropped images generated by cropping portions of the image;
for each cropped image, providing the cropped image as input to a feature extractor neural network trained to:
generate a plurality of resized images, each image in the plurality of resized images resized at a different scale;
center crop each image in the plurality of resized images;
generate a plurality of normalized resized images from the plurality of resized images; and
generate image feature data for each image in the plurality of normalized resized images; and
generating second multi-scale image feature data for each region of interest by aggregating the image feature data for each image in the plurality of normalized resized images.

16. The method of claim 10, wherein the logo comprises at least one of a symbol, word, or name.

17. The method of claim 10, wherein the database of logos comprises at least one manually labeled logo image.

18. The method of claim 17, wherein the database of logos comprises a set of retrieved logo images, the set of retrieved logo images generated by:
- providing the at least one manually labeled logo image as a query input to a database of images; and
- based on the query input, identifying visually similar images to the query input.

19. The method of claim 10, further comprising:
- accessing a second image from a computer device;
- analyzing the second image, the analysis comprising an identification of a category associated with at least one logo identified in the second image; and
- in response to analyzing the second image, causing display of an interactive window on a graphical user interface of the computer device, the interactive window comprising an indication of the category associated with the at least one logo identified second image.

20. A non-transitory computer-readable storage medium storing instructions that, when executed by at least one processor, cause the at least one processor to perform operations for few-shot logo recognition comprising:
- accessing an image comprising a plurality of regions of interest;
- identifying a plurality of objects within the plurality of regions of interest using a logo detector neural network, wherein for each object of the plurality of objects, the logo detector neural network is trained to generate an indication that the object is a logo;
- generating a first set of image feature data for the image and a second set of image feature data for the plurality of regions of interest;
- generating a first ranked list of logos from the identified plurality of objects, the first ranked list of logos generated based on matching the first set of image feature data with image feature data associated with a database of logos;
- generating a second ranked list of logos from the identified plurality of objects, the second ranked list of logos based on matching the second set of image feature data with the image feature data associated with the database of logos;
- generating a final ranked list of logos based on the first ranked list of logos and the second ranked list of logos; and
- identifying a category associated with each logo in the final ranked list of logos.

* * * * *